(12) United States Patent
Murakami et al.

(10) Patent No.: US 8,199,289 B2
(45) Date of Patent: Jun. 12, 2012

(54) OPTICAL FILM, LIQUID CRYSTAL PANEL, AND LIQUID CRYSTAL DISPLAY APPARATUS

(75) Inventors: Nao Murakami, Ibaraki (JP); Hiroyuki Yoshimi, Ibaraki (JP); Kentarou Takeda, Ibaraki (JP); Yoshiyuki Kiya, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 351 days.

(21) Appl. No.: 11/409,108

(22) Filed: Apr. 24, 2006

(65) Prior Publication Data
US 2006/0238681 A1 Oct. 26, 2006

(30) Foreign Application Priority Data
Apr. 26, 2005 (JP) ................................. 2005-127676

(51) Int. Cl.
*G02F 1/1335* (2006.01)
(52) U.S. Cl. ........................ 349/118; 349/119
(58) Field of Classification Search ........... 349/117–121
See application file for complete search history.

(56) References Cited

U.S. PATENT DOCUMENTS

| | | | | |
|---|---|---|---|---|
| 5,880,800 A * | 3/1999 | Mikura et al. | ................ | 349/122 |
| 6,330,108 B1 * | 12/2001 | Nishikouji et al. | ........... | 359/499 |
| 6,544,605 B1 * | 4/2003 | Verrall et al. | ................ | 428/1.3 |
| 6,661,487 B2 * | 12/2003 | Takahashi et al. | ........... | 349/115 |
| 7,072,015 B2 * | 7/2006 | Maeda | .......................... | 349/120 |
| 2002/0015120 A1 * | 2/2002 | Kameyama et al. | ........... | 349/95 |
| 2003/0164920 A1 * | 9/2003 | Kelly et al. | .................... | 349/194 |
| 2003/0169390 A1 * | 9/2003 | Miyachi | ........................ | 349/117 |
| 2003/0169391 A1 * | 9/2003 | Uchida et al. | ................. | 349/130 |
| 2004/0125292 A1 * | 7/2004 | Maeda | .......................... | 349/117 |
| 2004/0135949 A1 * | 7/2004 | Maeda | .......................... | 349/119 |
| 2004/0239641 A1 * | 12/2004 | Takahata et al. | ............. | 345/173 |
| 2004/0263731 A1 * | 12/2004 | Hata | ............................. | 349/118 |
| 2005/0030456 A1 * | 2/2005 | Murakami et al. | ........... | 349/117 |
| 2005/0052591 A1 * | 3/2005 | Joten | ............................. | 349/98 |
| 2005/0078245 A1 * | 4/2005 | Sasaki et al. | ................. | 349/117 |
| 2005/0140900 A1 * | 6/2005 | Jeon et al. | .................... | 349/141 |
| 2005/0243245 A1 * | 11/2005 | Taguchi et al. | ................ | 349/96 |

FOREIGN PATENT DOCUMENTS

CN 1499266 A1 5/2004
(Continued)

OTHER PUBLICATIONS

Chinese Office Action dated Dec. 21, 2007 issued in corresponding Application No. 200610076177.5.
Japanese Office Action dated Mar. 17, 2010, issued in corresponding Japanese Application No. 2005-127676.

*Primary Examiner* — Mark Robinson
*Assistant Examiner* — Charles Chang
(74) *Attorney, Agent, or Firm* — Westerman, Hattori, Daniels & Adrian, LLP

(57) ABSTRACT

There is provided: an optical film suitable for a liquid crystal display apparatus providing a colorless neutral display in all azimuth angle directions; a liquid crystal panel employing the optical film; and a liquid crystal display apparatus employing the liquid crystal panel. An optical film includes a transparent protective film, a polarizer, and a birefringent layer having a relationship of nx>ny=nz and positive uniaxial property, in the stated order, in which the polarizer and the birefringent layer are laminated directly through one of a pressure-sensitive adhesive and an adhesive.

14 Claims, 12 Drawing Sheets

FOREIGN PATENT DOCUMENTS

| | | |
|---|---|---|
| CN | 1591114 A1 | 3/2005 |
| JP | 11-95208 | 4/1999 |
| JP | 2001-91745 A | 4/2001 |
| JP | 2001-215329 A | 8/2001 |
| JP | 2002-90527 A | 3/2002 |
| JP | 2005-49398 A | 2/2005 |

* cited by examiner

OPTICAL FILM, LIQUID CRYSTAL PANEL, AND LIQUID CRYSTAL DISPLAY APPARATUS

BACKGROUND OF THE INVENTION

1. Field of the Invention

The present invention relates to an optical film, a liquid crystal panel, and a liquid crystal display apparatus. The present invention more specifically relates to an optical film suitable for a liquid crystal display apparatus providing a colorless neutral display in all azimuth angle directions, to a liquid crystal panel employing the optical film, and to a liquid crystal display apparatus employing the liquid crystal panel.

2. Description of the Related Art

FIG. 5A is a schematic sectional view of a typical conventional liquid crystal display apparatus, and FIG. 5B is a schematic sectional view of a liquid crystal cell to be used for the liquid crystal display apparatus. A liquid crystal display apparatus 900 is provided with: a liquid crystal cell 910; retardation plates 920 and 920' arranged on both sides of the liquid crystal cell 910; and polarizing plates 930 and 930' arranged on outer sides of the respective retardation plates 920 and 920'. Typically, the polarizing plates 930 and 930' are arranged such that respective polarization axes are perpendicular to each other. The liquid crystal cell 910 includes: a pair of substrates 911 and 911'; and a liquid crystal layer 912 as a display medium arranged between the substrates. One substrate 911 is provided with: a switching element (typically, TFT) for controlling electrooptic properties of liquid crystals; and a scanning line for providing a gate signal to this switching element and a signal line for providing a source signal thereto (the element and the lines not shown). The other substrate 911' is provided with: color layers 913R, 913G, and 913B forming a color filter; and a screen layer (black matrix layer) 914. A distance (cell gap) between the substrates 911 and 911' is controlled by a spacer (not shown).

The retardation plates are used for optical compensation of the liquid crystal display apparatus. In order to obtain optimum optical compensation (improvement in viewing angle properties, color shift, and contrast, for example), various attempts have been made in optimization of optical properties of the retardation plates and/or arrangement of the retardation plates in the liquid crystal display apparatus. As shown in FIG. 5A, the retardation plates are conventionally each arranged between the liquid crystal cell 910, and the polarizing plates 930 or 930' (see JP 11-95208A, for example).

Further improvement in screen evenness and in display quality has been demanded for a recent high-resolution and high-performance liquid crystal display apparatus. However, the conventional liquid crystal display apparatus hardly develops a colorless neutral display in all azimuth angle directions. Further, with development of a small and portable liquid crystal display apparatus, a demand for reduction in thickness of the liquid crystal display apparatus has increased.

SUMMARY OF THE INVENTION

The present invention has been made in view of solving the conventional problems as described above, and an object of the present invention is therefore to provide: an optical film suitable for a liquid crystal display apparatus providing a colorless neutral display in all azimuth angle directions; a liquid crystal panel employing the optical film; and a liquid crystal display apparatus employing the liquid crystal panel.

The optical film of the present invention includes a transparent protective film, a polarizer, and a birefringent layer having a relationship of nx>ny=nz and positive uniaxial property, in the stated order, in which the polarizer and the birefringent layer are laminated directly through one of a pressure-sensitive adhesive and an adhesive.

In a preferred embodiment of the optical film, the transparent protective film includes one of a cellulose-based film and a norbornene-based film.

In a preferred embodiment of the optical film, an absorption axis of the polarizer and a slow axis of the birefringent layer are substantially perpendicular to each other.

In a preferred embodiment of the optical film, the birefringent layer is a λ/4 plate.

In a preferred embodiment of the optical film, the birefringent layer has an in-plane retardation Δnd of 90 to 160 nm.

In a preferred embodiment of the optical film, the birefringent layer has an absolute value of difference between an in-plane retardation Δnd and a thickness direction retardation Rth of 10 nm or less.

In a preferred embodiment of the optical film, the birefringent layer has an absolute value of photoelastic coefficient of $2.0 \times 10^{-13}$ to $2.0 \times 10^{-11}$ m$^2$/N.

In a preferred embodiment of the optical film, the birefringent layer contains one of a cyclic olefin-based resin and a cellulose-based resin.

In a preferred embodiment, the optical film further includes an easily adhesive layer between the birefringent layer and one of a pressure-sensitive adhesive layer formed of the pressure-sensitive adhesive and an adhesive layer formed of the adhesive.

In a preferred embodiment of the optical film, the easily adhesive layer contains one resin selected from the group consisting of a silicon-based resin, a urethane-based resin, and an acrylic resin.

Another aspect of the present invention provides a liquid crystal panel. The liquid crystal panel of the present invention includes a liquid crystal cell, and the optical film of the present invention which is arranged on one side of the liquid crystal cell.

In a preferred embodiment of the liquid crystal panel, the liquid crystal cell is of VA mode.

In a preferred embodiment of the liquid crystal panel, the liquid crystal cell is of OCB mode.

In a preferred embodiment of the liquid crystal panel, the liquid crystal cell includes the optical film of the present invention arranged on a viewer side, and the liquid crystal cell includes a birefringent layer having a relationship of nx≧ny>nz arranged on a backlight side.

In a preferred embodiment of the liquid crystal panel, the birefringent layer on a backlight side contains one selected from the group consisting of polyamide, polyimide, polyester, polyether ketone, polyamide imide, and polyesterimide.

In a preferred embodiment of the liquid crystal panel, the birefringent layer on a backlight side has a relationship of nx=ny>nz.

In a preferred embodiment of the liquid crystal panel, the birefringent layer on a backlight side has a relationship of nx>ny>nz.

Another aspect of the present invention provides a liquid crystal display apparatus. The liquid crystal display apparatus of the present invention includes the liquid crystal panel of the present invention.

The present invention can provide: an optical film suitable for a liquid crystal display apparatus providing a colorless neutral display in all azimuth angle directions; a liquid crystal panel employing the optical film; and a liquid crystal display apparatus employing the liquid crystal panel. Such an effect can be provided significantly by laminating directly a polarizer, and a birefringent layer having a relationship of nx>ny=nz and positive uniaxial property through a pressure-sensitive adhesive or an adhesive and without a transparent protective film arranged therebetween. Therefore, reduction in thickness of the liquid crystal display apparatus may also be realized.

DESCRIPTION OF THE PREFERRED EMBODIMENTS

Definitions of Terms and Symbols

Definitions of terms and symbols in the specification of the present invention are described below.

(1) The symbol "nx" refers to a refractive index in a direction providing a maximum in-plane refractive index (that is, a slow axis direction), and the symbol "ny" refers to a refractive index in a direction perpendicular to the slow axis in the same plane (that is, a fast axis direction). The symbol "nz" refers to a refractive index in a thickness direction. Further, the expression "nx=ny", for example, not only refers to a case where nx and ny are exactly equal but also includes a case where nx and ny are substantially equal. In the specification of the present invention, the phrase "substantially equal" includes a case where nx and ny differ within a range providing no effects on overall polarization properties of an optical film in practical use.

(2) The term "in-plane retardation Δnd" refers to an in-plane retardation value of a film (layer) measured at 23° C. by using light of a wavelength of 590 nm. Δnd can be determined from an equation $\Delta nd=(nx-ny)\times d$, where nx and ny represent refractive indices of a film (layer) at a wavelength of 590 nm in a slow axis direction and a fast axis direction, respectively, and d (nm) represents a thickness of the film (layer).

(3) The term "thickness direction retardation Rth" refers to a thickness direction retardation value measured at 23° C. by using light of a wave length of 590 nm. Rth can be determined from an equation $Rth=(nx-nz)\times d$, where nx and nz represent refractive indices of a film (layer) at a wavelength of 590 nm in a slow axis direction and a thickness direction, respectively, and d (nm) represents a thickness of the film (layer).

Figure 1:
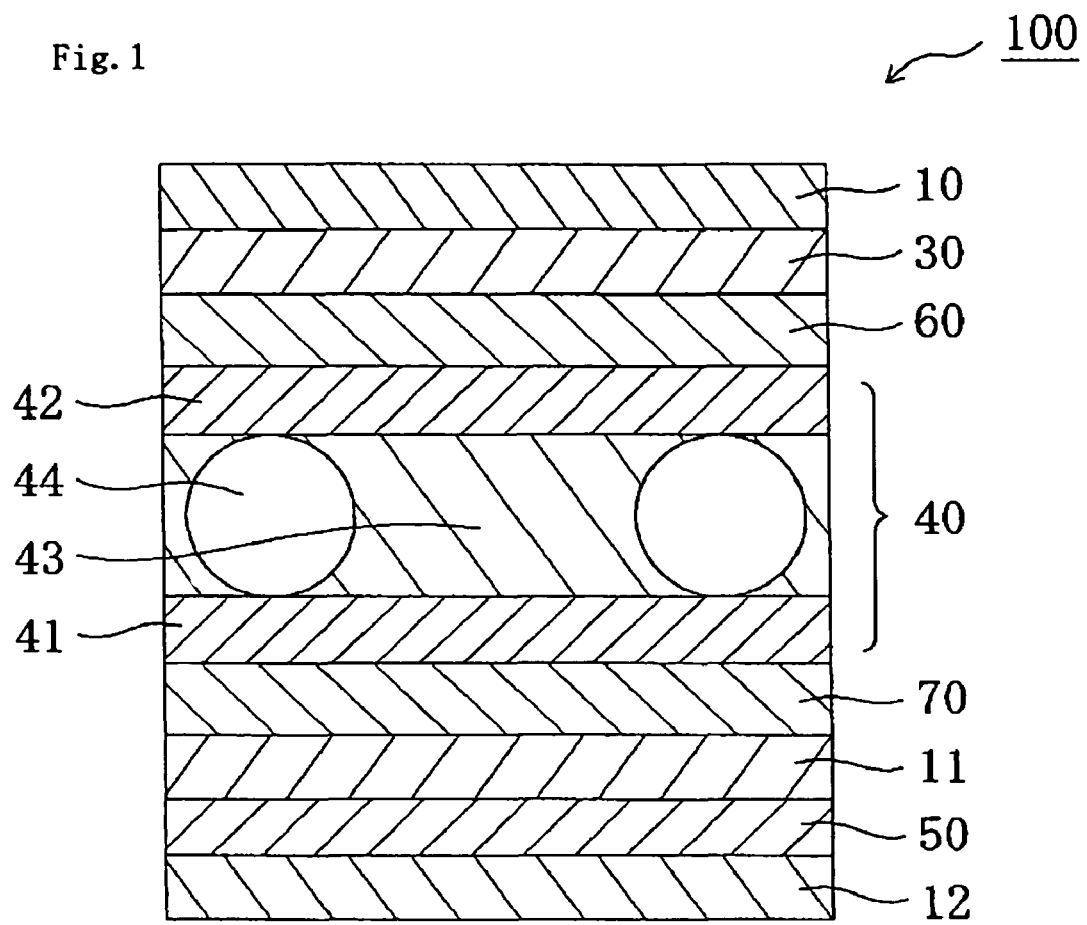
FIG. 1 is a schematic sectional view of a liquid crystal panel according to a preferred embodiment of the present invention.

A. Structure of Liquid Crystal Panel and Liquid Crystal Display Apparatus Including the Same FIG. 1 is a schematic sectional view explaining a preferred embodiment of a liquid crystal panel of the present invention. A liquid crystal panel 100 is provided with: a first transparent protective film 10; a first polarizer 30; a first birefringent layer 60; a liquid crystal cell 40; a second birefringent layer 70; a second transparent protective film 11; a second polarizer 50; and a third transparent protective film 12 in the order given. The first transparent protective film, the first polarizer, and the first birefringent layer may be arranged on a viewer side or a backlight side of the liquid crystal cell, but are preferably arranged on a viewer side of the liquid crystal cell.

The first birefringent layer 60 is a birefringent layer having a relationship of nx>ny=nz and positive uniaxial property. The second birefringent layer 70 is a birefringent layer having a relationship of nx≧ny>nz. Details of the first birefringent layer 60 and the second birefringent layer 70 are described below.

In FIG. 1, a laminate of the first transparent protective film 10, the first polarizer 30, and the first birefringent layer 60 is a preferred embodiment of an optical film of the present invention. In the optical film of the present invention, it is important that the first polarizer 30 and the first birefringent layer 60 be laminated directly through a pressure-sensitive adhesive or an adhesive and without a transparent protective film arranged therebetween. In this way, an optical film suitable for a liquid crystal display apparatus providing a colorless neutral display in all azimuth angle directions can be provided.

An absorption axis of the first polarizer 30 and a slow axis of the first birefringent layer 60 are substantially perpendicular to each other.

The liquid crystal cell 40 includes: a pair of glass substrates 41 and 42; and a liquid crystal layer 43 as a display medium arranged between the substrates. One substrate (active matrix substrate) 41 is provided with: a switching element (typically, TFT) for controlling electrooptic properties of liquid crystals; and a scanning line for providing a gate signal to the switching element and a signal line for providing a source signal thereto (the lines not shown). The other glass substrate (color filter substrate) 42 is provided with a color filter (now shown). Note that the color filter may be provided in the active matrix substrate 41 as well. A distance (cell gap) between the substrates 41 and 42 is controlled by a spacer 44. An aligned film (not shown) formed of polyimide, for example, is provided on a side of each of the substrates 41 and 42 in contact with the liquid crystal layer 43.

Any appropriate drive mode can be employed for drive mode of the liquid crystal cell 40 as long as effects of the present invention can be obtained. Specific examples of the drive mode include STN (Super Twisted Nematic) mode, TN (Twisted Nematic) mode, IPS (In-Plane Switching) mode, VA (Vertical Aligned) mode, OCB (Optically Aligned Birefringence) mode, HAN (Hybrid Aligned Nematic) mode, and ASM (Axially Symmetric Aligned Microcell) mode. The VA mode and the OCB mode are preferred because of their remarkable improvements in color shifts.

Figure 2A:
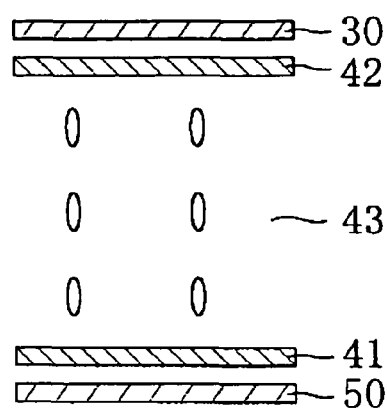
FIGS. 2A and 2B are each a schematic sectional view explaining an alignment state of liquid crystal molecules of a liquid crystal layer in the case where a liquid crystal display apparatus of the present invention employs a liquid crystal cell of VA mode.
Figure 2B:
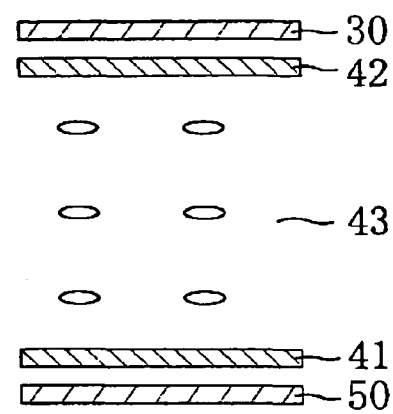

FIGS. 2A and 2B are each a schematic sectional view explaining an alignment state of liquid crystal molecules in VA mode. As shown in FIG. 2A, the liquid crystal molecules are aligned vertically to surfaces of the substrates 41 and 42 under no voltage application. Such vertical alignment may be realized by arranging nematic liquid crystals having negative dielectric anisotropy between substrates each having formed thereon a vertically aligned film (not shown). Light enters from a surface of one substrate 41 in such a state, and linear polarized light allowed to pass through the second polarizer 50 and to enter the liquid crystal layer 43 advances along long axes of vertically aligned liquid crystal molecules. No birefringence generates in a long axis direction of the liquid crystal molecules such that incident light advances without changing a polarization direction and is absorbed by the first polarizer 30 having a polarization axis perpendicular to the second polarizer 50. In this way, dark display is obtained under no voltage application (normally black mode). As shown in FIG. 2B, long axes of the liquid crystal molecules align parallel to the surfaces of the substrates under voltage application between electrodes. The liquid crystal molecules exhibit birefringence with respect to linear polarized light entering the liquid crystal layer 43 in such a state, and a polarization state of incident light varies depending on inclination of the liquid crystal molecules. Light allowed to pass through the liquid crystal layer under application of a predetermined maximum voltage rotates its polarization direction by 90°, for example, into linear polarized light and passes through the first polarizer 30, to thereby provide light display. Return to a state under no voltage application provides dark display again by alignment control force. The inclination of the liquid crystal molecules is controlled by varying an application voltage. Therefore, an intensity of transmitted light from the first polarizer 30 may change, to thereby provide gradient display.

Figure 3A:
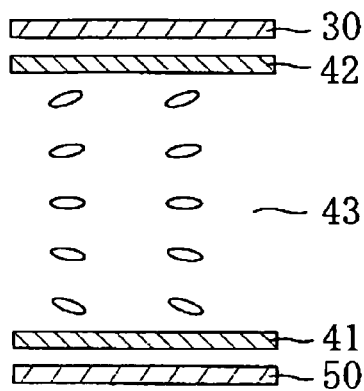
FIGS. 3A to 3D are each a schematic sectional view explaining an alignment state of liquid crystal molecules of a liquid crystal layer in the case where a liquid crystal display apparatus of the present invention employs a liquid crystal cell of OCB mode.
Figure 3B:
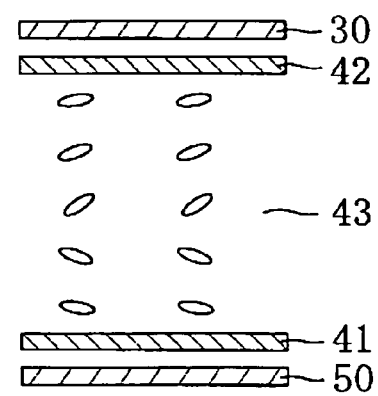
Figure 3C:
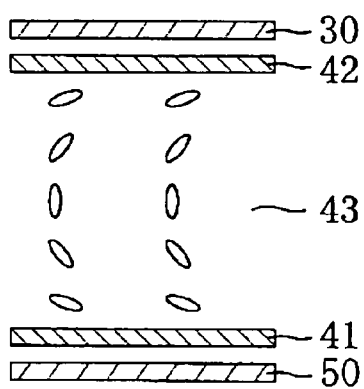
Figure 3D:
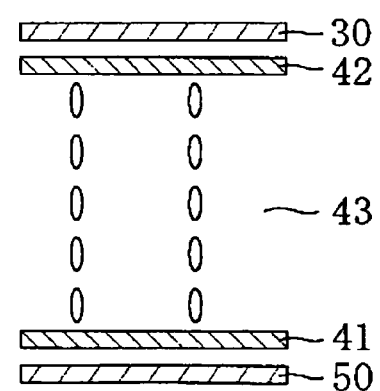

FIGS. 3A to 3D are each a schematic sectional view explaining an alignment state of liquid crystal molecules in OCB mode. The OCB mode refers to drive mode in which the liquid crystal layer 43 is formed of so-called bend alignment. As shown in FIG. 3C, the bend alignment refers to an alignment state in which: nematic liquid crystal molecules are aligned at a substantially parallel angle (alignment angle) in a vicinity of a substrate; the alignment angle forms a vertical angle with respect to a plane of the substrate toward the center of the liquid crystal layer; the alignment changes progressively and continuously to be parallel to the opposing substrate surface away from the center of the liquid crystal layer; and no twisted structure exists throughout the liquid crystal layer. Such bend alignment is formed as described below. As shown in FIG. 3A, the liquid crystal molecules have substantially homogeneous alignment in a state in the absence of an electric field (initial state). However, the liquid crystal molecules each have a pretilt angle, and a pretilt angle in a vicinity of the substrate differs from a pretilt angle in the vicinity of the opposing substrate. Upon application of a predetermined bias voltage (typically, 1.5 V to 1.9 V) (under low voltage application), the liquid crystal molecules undergo a spray alignment as shown in FIG. 3B and transfer to a bend alignment as shown in FIG. 3C. Upon application of a display voltage (typically, 5 V to 7 V) (under high voltage application), the liquid crystal molecules in a bend alignment state align substantially vertically to the surface of the substrate as shown in FIG. 3D. In normally white display mode, light allowed to pass through the second polarizer 50 and to enter the liquid crystal layer in a state as shown in FIG. 3D under high voltage application advances without changing a polarization direction and is absorbed by the first polarizer 30, to thereby provide dark display. Reduction in display voltage returns the liquid crystal molecules into bend alignment by alignment control force of rubbing treatment, to thereby provide light display again. The inclination of the liquid crystal molecules is controlled by varying a display voltage. Therefore, an intensity of transmitted light from the polarizer may change, to thereby provide gradient display. A liquid crystal display apparatus provided with a liquid crystal cell of OCB mode allows very high speed switching of phase transfer from spray alignment state to bend alignment state, and thus has a characteristic of better movie display properties than those of a liquid crystal display apparatus provided with a liquid crystal cell of other drive mode such as TN mode or IPS mode.

The display mode of the liquid crystal cell of OCB mode may be: normally white mode which exhibits a dark state (black display) under high voltage application; or normally black mode which exhibits a bright state (white display) under high voltage application.

A cell gap of the liquid crystal cell of OCB mode is preferably 2 μm to 10 μm, more preferably 3 μm to 9 μm, and particularly preferably 4 μm to 8 μm. A cell gap within the above ranges can reduce a response time and provide favorable display properties.

The nematic liquid crystals to be used for the liquid crystal cell of OCB mode preferably have positive dielectric anisotropy. Specific examples of the nematic liquid crystals having positive dielectric anisotropy include those described in JP 09-176645 A. Further, commercially available nematic liquid crystals may be used as they are. Examples of the commercially available nematic liquid crystals include "ZLI-4535" and "ZLI-1132" (tradename, manufactured by Merck Ltd., Japan). A difference between the ordinary index of refraction (no) and extraordinary index of refraction (ne) of the nematic liquid crystals, that is, a birefringence ($\Delta n_{LC}$) may appropriately be selected in accordance with response speed and transmittance of the liquid crystals, and the like. However, the birefringence is preferably 0.05 to 0.30, more preferably 0.10 to 0.30, and further more preferably 0.12 to 0.30. Such nematic liquid crystals each have a pretilt angle of preferably 1° to 10°, more preferably 2 to 8°, and particularly preferably 3° to 6°. A pretilt angle within above ranges can reduce response time and provide favorable display properties.

The liquid crystal panel as described above may suitably be used for a liquid crystal display apparatus such as a personal computer, a liquid crystal television, a cellular phone, a portable digital assistance (PDA), or a projector.

B. Polarizer

The polarizers (first polarizer 30, second polarizer 50) of the present invention are each formed of a polyvinyl alcohol-based resin. The polarizers of the present invention are each preferably prepared by coloring a polyalcohol-based resin film with a dichromatic substance (typically, iodine or dichromatic dye) and uniaxially stretching the colored resin. A polyvinyl alcohol-based resin used for forming the polyvinyl alcohol-based resin film has a degree of polymerization of preferably 100 to 5,000, and more preferably 1,400 to 4,000. The polyvinyl alcohol-based resin film used for forming a polarizer may be formed through any appropriate method (such as a flow casting method in which a solution prepared by dissolving a resin in water or an organic solvent is used for film formation through flow casting, a casting method, or an extrusion method). A thickness of the polarizer may appropriately be set in accordance with the purpose or application of a liquid crystal display apparatus or image display apparatus to be used, but is preferably 5 to 80 µm.

A method of producing a polarizer involves subjecting the polyvinyl alcohol-based resin film to a production process including a coloring step, a crosslinking step, a stretching step, a washing step, and a drying step. In each of the steps except the drying step, each treatment is performed by immersing the polyvinyl alcohol-based resin film in a bath containing a solution to be used for each of the steps. The order, number, and the implementation or omission of treatments in the coloring step, the crosslinking step, the stretching step, the washing step, and the drying step may appropriately be set in accordance with the purpose, materials to be used, conditions, and the like. For example, several treatments may be performed at the same time in one step, or specific treatments may be omitted. To be specific, the stretching treatment, for example, may be performed after the coloring treatment, before the coloring treatment, or during the coloring treatment and the crosslinking treatment. Further, the crosslinking treatment is preferably performed before or after the stretching treatment, for example. Further, the washing treatment may be performed after each treatment, or performed after specific treatments. Particularly preferably, the coloring step, the crosslinking step, the stretching step, the washing step, and the drying step are preferably performed in the order given. Further, a swelling step may be performed before the coloring step as a preferred mode.

(Swelling Step)

The swelling step refers to a step of swelling the polyvinyl alcohol-based resin film. Typically, the swelling step is performed by immersing the polyvinyl alcohol-based resin film in a treatment bath (swelling bath) filled with water. This treatment allows washing of contamination or an antiblocking agent on a surface of the polyvinyl alcohol-based resin film, and prevention of unevenness such as uneven coloring by swelling the polyvinyl alcohol-based resin film. Glycerin or potassium iodide may appropriately be added to the swelling bath. A temperature of the swelling bath is preferably 20 to 60° C., and more preferably 20 to 50° C. An immersion time in the swelling bath is preferably 0.1 to 10 minutes, and more preferably 1 to 7 minutes. Note that the polyvinyl alcohol-based resin film may be swelled in the coloring step as described below, and thus the swelling step may be omitted.

In pulling out of the film from the swelling bath, any appropriate liquid dripping preventing rolls such as pinch rolls may be used as required for preventing liquid dripping, or excess water may be removed through a method of removing a liquid by an air knife or the like.

(Coloring Step)

The coloring step is typically performed by immersing (also referred to as adsorbing or contacting) the polyvinyl alcohol-based resin film in a treatment bath (coloring bath) containing a dichromatic substance such as iodine. Water is generally used as a solvent to be used for a solution of the coloring bath, but an appropriate amount of an organic solvent having compatibility with water may also be added; The dichromatic substance is used in a ratio of preferably 0.01 to 10 parts by weight, more preferably 0.02 to 7 parts by weight, and more preferably 0.025 to 5 parts by weight with respect to 100 parts by weight of the solvent.

An arbitrary and appropriate substance suitable for the present invention can be used as the dichromatic substance, and examples of the substance includes iodine and an organic dye. Examples of the organic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

In the coloring step, one type of dichromatic substance may be used, or two or more types thereof may be used in combination. In the case where an organic dye is used, two or more types of dichromatic substances are preferably used for neutralization of a visible light region, for example. Specific examples of the combination include: Congo Red and Supra Blue G; Supra Orange GL and Direct Sky Blue; and Direct Sky Blue and Fast Black.

In the case where iodine is used as a dichromatic substance, the solution of the coloring bath preferably further contains an auxiliary agent such as an iodide for improving coloring efficiency. Specific examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The auxiliary agent is used in a ratio of preferably 0.02 to 20 parts by weight, more preferably 0.01 to 10 parts by weight, and furthermore preferably 0.1 to 5 parts by weight with respect to 100 parts by weight of the solvent. A ratio (weight ratio) of iodine to auxiliary agent (preferably, potassium iodide) is preferably 1:5 to 1:100, more preferably 1:6 to 1:80, and furthermore preferably 1:7 to 1:70.

A temperature of the coloring bath is preferably 5 to 70° C., more preferably 5 to 42° C., and furthermore preferably 10 to 35° C. An immersion time in the coloring bath is preferably 1 to 20 minutes, and more preferably 2 to 10 minutes.

In the coloring step, the film may be stretched in the coloring bath. A cumulative total stretch ratio at this time is preferably 1.1 to 4.0 times.

The coloring treatment in the coloring step may employ a method involving applying or spraying an aqueous solution containing a dichromatic substance to the polyvinyl alcohol-based resin film, in addition to the method involving immersing the resin film in the coloring bath as described above. Further, the dichromatic substance may be mixed into the film during film formation in the previous step. In this case, the previous step and the coloring step are performed at the same time.

In pulling out of the film from the coloring bath, any appropriate liquid dripping preventing rolls such as pinch rolls may be used as required for preventing liquid dripping, or excess water may be removed through a method of removing a liquid with an air knife or the like.

(Crosslinking Step)

The crosslinking step is typically performed by immersing the polyvinyl alcohol-based resin film subjected to the coloring treatment in a treatment bath (crosslinking bath) containing a crosslinking agent. Any appropriate crosslinking agent may be used as the crosslinking agent. Specific examples of the crosslinking agent include a boron compound such as boric acid or borax, glyoxal, and glutaraldehyde. One type of crosslinking agent may be used alone or the crosslinking agents may be used in combination. In the case where two or more types thereof are used in combination, for example, a combination of boric acid and borax is preferred. A ratio (molar ratio) of the combination is preferably 4:6 to 9:1, more preferably 5.5:4.5 to 7:3, and furthermore preferably 5.5:4.5 to 6.5:3.5.

Water is generally used as a solvent to be used for a solution of the crosslinking bath, but an appropriate amount of an organic solvent having compatibility with water may also be added. The crosslinking agent is typically used in a ratio of 1 to 10 parts by weight with respect to 100 parts by weight of the solvent. A concentration of the crosslinking agent of less than 1 part by weight often provides insufficient optical properties. A concentration of the crosslinking agent of more than 10 parts by weight increases stretching force on the film during stretching and may shrink a polarizing plate to be obtained, for example.

The solution of the crosslinking bath preferably further contains an auxiliary agent containing potassium iodide as an essential component for providing even properties in the plane of the film. A concentration of the auxiliary agent is preferably 0.05 to 15 wt %, more preferably 0.1 to 10 wt %, and furthermore preferably 0.5 to 8 wt %. Examples of the auxiliary agent except potassium iodide include lithium iodide, sodium iodide, zinc iodide, aluminum iodide, lead iodide, copper iodide, barium iodide, calcium iodide, tin iodide, and titanium iodide. One type of auxiliary agent may be used, or two or more types thereof may be used in combination.

A temperature of the crosslinking bath is preferably 20 to 70° C., and more preferably 40 to 60° C. An immersion time in the crosslinking bath is preferably 1 second to 15 minutes, and more preferably 5 seconds to 10 minutes.

Similar to the coloring step, the crosslinking step may employ a method involving applying or spraying a crosslinking agent-containing solution to the film. In the crosslinking step, the film may be stretched in the crosslinking bath. A cumulative total stretch ratio at this time is preferably 1.1 to 4.0 times.

In pulling out of the film from the crosslinking bath, any appropriate liquid dripping preventing rolls such as pinch rolls may be used as required for preventing liquid dripping, or excess water may be removed through a method of removing a liquid with an air knife or the like.

(Stretching Step)

The stretching step refers to a step of stretching the polyvinyl alcohol-based resin film. The stretching step may be performed at any stage of the production process of the polarizer as described above. To be specific, the stretching step may be performed after the coloring treatment, before the coloring treatment, during the swelling treatment, coloring treatment, or crosslinking treatment, or after the crosslinking treatment.

A cumulative total stretch ratio of the polyvinyl alcohol-based resin film is preferably 2 to 7 times, more preferably 5 to 7 times, and further more preferably 5 to 6.5 times. A cumulative total stretch ratio of less than 2 times may cause difficulties in obtaining a polarizing plate with a high degree of polarization. A cumulative total stretch ratio of more than 7 times may cause the polyvinyl alcohol-based resin film (polarizer) to be liable to tear. The film after stretching has a thickness of preferably 3 to 75 μm, and more preferably 5 to 50 μm.

Any appropriate method may be employed as a specific stretching method. Examples thereof include: a wet stretching method in which the polyvinyl alcohol-based resin film is stretched in a hot aqueous solution; and a dry stretching method in which the polyvinyl alcohol-based resin film containing water is stretched in air. In the case where the wet stretching method is employed, the polyvinyl alcohol-based resin film is stretched to a predetermined ratio in a treatment bath (stretching bath).

A solution of the stretching bath to be used is preferably a solution containing potassium iodide as an essential component in a solvent such as water or an organic solvent (ethanol, for example) The solution may contain one type or two or more types of compounds selected from various metal salts, a boron or zinc compound, lithium iodide, sodium iodide, zinc iodide, aluminum iodide, lead iodide, copper iodide, barium iodide, calcium iodide, tin iodide, and titanium iodide, in addition to potassium iodide. Of those, boric acid is preferably contained. A concentration of potassium iodide is preferably 0.05 to 15 wt %, more preferably 0.1 to 10 wt %, and furthermore preferably 0.5 to 8 wt %. In the case where boric acid and potassium iodide are used in combination, a ratio (weight ratio) of the combination is preferably 1:0.1 to 1:4, and more preferably 1:0.5 to 1:3.

A temperature of the stretching bath is preferably 30 to 70° C., more preferably 40 to 67° C., and furthermore preferably 50 to 62° C. Dry stretching is preferably performed at 50 to 180° C.

In pulling out of the film from the stretching bath, any appropriate liquid dripping preventing rolls such as pinch rolls may be used as required for preventing liquid dripping, or excess water may be removed through a method of removing a liquid with an air knife or the like.

(Washing Step)

The washing step is typically performed by immersing the polyvinyl alcohol-based resin film subjected to the various treatments in a treatment bath (water washing bath). The washing step allows washing away of undesired remains on the polyvinyl alcohol-based resin film. The washing bath includes an aqueous solution containing potassium iodide as an essential component. The aqueous solution may contain one type or two or more types of compounds selected from lithium iodide, sodium iodide, zinc iodide, aluminum iodide, lead iodide, copper iodide, barium iodide, calcium iodide, tin iodide, and titanium iodide, in addition to potassium iodide. A concentration of potassium iodide is preferably 0.05 to 15 wt %, more preferably 0.1 to 10 wt %, furthermore preferably 3 to 8 wt %, and particularly preferably 0.5 to 8 wt %. The aqueous iodide solution may be added with an auxiliary agent such as zinc sulfate or zinc chloride.

A temperature of the washing bath is preferably 10 to 60° C., more preferably 15 to 40° C., and furthermore preferably 30 to 40° C. An immersion time in the washing bath is preferably 1 second to 1 minute. The washing step may be performed only once, or may be performed several times as required. In the case where the washing step is performed several times, the types and concentrations of additives in the washing bath to be used for each treatment may appropriately be adjusted. For example, the washing step involves: a step of immersing a polymer film in an aqueous solution of potassium iodide (0.1 to 10 wt %, 10 to 60° C.) for 1 second to 1 minute; and a step of washing the polymer film with pure water.

In pulling out of the film from the washing bath, any appropriate liquid dripping preventing rolls such as pinch rolls may be used as required for preventing liquid dripping, or excess water may be removed through a method of removing a liquid with an air knife or the like.

(Drying Step)

Any appropriate drying method (natural drying, air drying, or heat drying, for example) may be employed for the drying step. Heat drying is preferably employed. In heat drying, a drying temperature is preferably 20 to 80° C., more preferably 20 to 60° C., and more preferably 20 to 45° C. A drying time is preferably 1 to 10 minutes. The polarizer is obtained as described above.

C. Transparent Protective Film

As described above, a transparent protective film (the transparent protective film 10 in FIG. 1) may be provided on one side of the first polarizer 30 (a side without the first birefringent layer arranged) for practical purposes. As shown in FIG. 1, in the case where the liquid crystal panel of the present invention includes the second polarizer 50, a transparent protective film (the transparent protective film 11 or 12 in FIG. 1) may be provided on at least one side of the second polarizer 50. The transparent protective film is provided, to thereby prevent degradation of the polarizer.

As a preferred mode of lamination of the first polarizer or the second polarizer, and a transparent protective film, the first polarizer or the second polarizer is bonded to the transparent protective film through an adhesive layer.

The adhesive layer is preferably a layer formed of a polyvinyl alcohol-based adhesive. The polyvinyl alcohol-based adhesive contains a polyvinyl alcohol-based resin and a crosslinking agent.

Examples of the above-mentioned polyvinyl alcohol-based resin include without particular limitation: a polyvinyl alcohol obtained by saponifying polyvinyl acetate; derivatives thereof; a saponified product of a copolymer obtained by copolymerizing vinyl acetate with a monomer having copolymerizability with vinyl acetate; and a modified polyvinyl alcohol obtained by modifying polyvinyl alcohol to acetal, urethane, ether, graft, or phosphate. Examples of the monomer include: maleic (anhydrides), fumaric acid, crotonic acid, itaconic acid, and unsaturated carboxylic acids such as (meth)acrylic acid and esters thereof; α-orefin such as ethylene and propylene; (sodium) (meth)allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. The polyvinyl alcohol-based resins may be used alone or in combination of two or more thereof.

The polyvinyl alcohol-based resin has an average degree of polymerization of preferably 100 to 3,000, and more preferably 500 to 3,000, and an average degree of saponification of 85 to 100 mol %, and more preferably 90 to 100 mol % from a viewpoint of adhesive property.

A polyvinyl alcohol-based resin having an acetoacetyl group may be used as the above-mentioned polyvinyl alcohol-based resin. The polyvinyl alcohol-based resin having an acetoacetyl group is a polyvinyl alcohol-based adhesive having a highly reactive functional group and is preferred from the viewpoint of improving durability of an optical film to be obtained.

The polyvinyl alcohol-based resin having an acetoacetyl group is obtained in a reaction between the polyvinyl alcohol-based resin and diketene through a known method. Examples of the known method include: a method involving dispersing the polyvinyl alcohol-based resin in a solvent such as acetic acid, and adding diketene thereto; and a method involving dissolving the polyvinyl alcohol-based resin in a solvent such as dimethylformamide or dioxane, and adding diketene thereto. Another example of the known method is a method involving directly bringing diketene gas or a liquid diketene into contact with polyvinyl alcohol.

A degree of acetoacetyl modification of the polyvinyl alcohol-based resin having an acetoacetyl group is not particularly limited as long as it is 0.1 mol % or more. A degree of acetoacetyl modification of less than 0.1 mol % provides insufficient water resistance of the adhesive layer and is inappropriate. The degree of acetoacetyl modification is preferably 0.1 to 40 mol %, and more preferably 1 to 20 mol %. A degree of acetoacetyl modification of more than 40 mol % decreases the number of reaction sites with a crosslinking agent and provides a small effect of improving the water resistance. The degree of acetoacetyl modification is a value measured by NMR.

A crosslinking agent used for the polyvinyl alcohol-based adhesive may be used without particular limitation.

A compound having at least two functional groups each having reactivity with a polyvinyl alcohol-based resin can be used as a crosslinking agent. Examples of the compound include: alkylene diamines having an alkylene group and two amino groups such as ethylene diamine, triethylene amine, and hexamethylene dimamine (of those, hexamethylene diamine is preferred); isocyanates such as tolylene diisocyanate, hydrogenated tolylene diisocyanate, a trimethylene propane tolylene diisocyanate adduct, triphenylmethane triisocyanate, methylene bis(4-phenylmethane)triisocyanate, isophorone diisocyanate, or ketoxime blocked compounds thereof or phenol blocked compounds thereof; epoxides such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino/formaldehyde resin such as a condensate of formaldehyde with methylolurea, methylolmelamine, alkylated methylolurea, alkylated methylol melamine, acetoguanamine, or benzoguanamine; and salts of divalent metals or trivalent metals such as sodium, potassium, magnesium, calcium, aluminum, iron, and nickel and oxides thereof. A melamine-based crosslinking agent is preferred as a crosslinking agent, and methylolmelamine is particularly preferred.

A mixing amount of the crosslinking agent is preferably 0.1 to 35 parts by weight, and more preferably 10 to 25 parts by weight with respect to 100 parts by weight of the polyvinyl alcohol-based resin. Meanwhile, for improving the durability, the crosslinking agent may be mixed within a range of more than 30 parts by weight and 46 parts by weight or less with respect to 100 parts by weight of the polyvinyl alcohol-based resin. In particular, in the case where the polyvinyl alcohol-based resin having an acetoacetyl group is used, the crosslinking agent is preferably used in an amount of more than 30 parts by weight. The crosslinking agent is mixed within a range of more than 30 parts by weight and 46 parts by weight or less, to thereby improve the water resistance.

Note that the above-mentioned polyvinyl alcohol-based adhesive may further contain: a coupling agent such as a silane coupling agent or a titanium coupling agent; various tackifiers; a UV absorber; an antioxidant; and a stabilizer such as a heat resistant stabilizer or a hydrolysis resistant stabilizer.

A surface in contact with the first polarizer 30 (preferably, a transparent protective film surface of the laminate A or a protective film surface of a polarizer) may be subjected to easily adhesive treatment for improving adhesive property. Examples of the easily adhesive treatment include corona treatment, plasma treatment, low-pressure UV treatment, surface treatment such as saponification treatment, and a method of forming an anchor layer, and those may be used in combination. Of those, corona treatment, a method of forming an anchor layer, and a method of combining the corona treatment and the method of forming an anchor layer are preferred.

An example of the anchor layer is a silicone layer having a reactive functional group. A material for the silicone layer having a reactive functional group is not particularly limited. However, examples thereof include: isocyanate group-containing alkoxy silanols; amino group-containing alkoxy silanols; mercapto group-containing alkoxy silanols; carboxy group-containing alkoxy silanols; epoxy group-containing alkoxy silanols; vinyl unsaturated group-containing alkoxy silanols; halogen group-containing alkoxy silanols; and isocyanate group-containing alkoxy silanols. Amino-based silanols are preferred. A titanium-based catalyst or a tin-based catalyst for effectively reacting the silanols may be added, to thereby enhance the adhesive strength. The silicone having a reactive functional group may contain other additives added. Specific examples thereof that may be used include: a tackifier formed of a terpene resin, a phenol resin, a terpene/phenol resin, a rosin resin, a xylene resin, or the like; a UV absorber; an antioxidant; and a stabilizer such as a heat resistant stabilizer.

The silicone layer having a reactive functional group is formed by applying and drying through a known method. The silicone layer has a thickness of preferably 1 to 100 nm, and more preferably 10 to 50 nm after drying. For application, silicone having a reactive functional group may be diluted with a solvent. A diluting solvent is not particularly limited, but examples thereof include alcohols. A dilution concentration is not particularly limited, but is preferably 1 to 5 wt %, and more preferably 1 to 3 wt %.

The adhesive layer is preferably formed by applying the adhesive to the transparent protective film on an adhesive surface to the polarizer, to the polarizer on an adhesive surface to the transparent protective film, or to both the adhesive surfaces of the polarizer and the transparent protective film. After the polarizer and the transparent protective film are attached together, the whole is preferably subjected to a drying step to form an adhesive layer formed of an applied and dried layer. The adhesive layer may be formed and then attached. The attachment may be performed by using a roll laminator or the like. A heat drying temperature and a drying time may appropriately be determined in accordance with the type of adhesive.

The adhesive layer has a thickness of preferably 0.01 to 10 µm, and more preferably 0.03 to 5 µm because too large a thickness after drying is not preferred from the viewpoint of adhesive property.

For the transparent protective film, any appropriate protective film may be employed. An example of a material that constitutes the transparent protective film includes a thermoplastic resin having excellent properties such as transparency, mechanical strength, thermal stability, water repellency, and isotropy etc. Specific examples of such thermoplastic resin include: an acetate resin such as triacetyl cellulose (TAC); a polyester resin; a polyethersulfone resin; a polysulfone resin; a polycarbonate resin; a polyamide resin; a polyimide resin; a polyolefin resin; an acrylic resin; a polynorbornene resin; a cellulose resin; a polyallylate resin; a polystyrene resin; a polyvinyl alcohol resin; a polyacrylic resin; and a mixture thereof. Moreover, a thermosetting resin or ultraviolet curing resin of an acryl-, urethane-, acrylicurethane-, epoxy-, or silicone-base or the like may also be used. A cellulose-based film (such as a TAC film having its surface saponified with an alkali or the like) or a norbornene-based film (such as a polynorbornene resin film) is preferred in view of polarization properties and durability.

Further, a polymer film formed of a resin composition as described in JP 2001-343529 A (WO 01/37007), for example, may be used for the protective film. To be specific, the resin composition refers to a mixture of: a thermoplastic resin having a substituted imide group or an unsubstituted imide group on a side chain; and a thermoplastic resin having a substituted phenyl group or an unsubstituted phenyl group, and a cyano group on a side chain. A specific example thereof is a resin composition containing: an alternating copolymer of isobutene and N-methylene maleimide; and an acrylonitrile/styrene copolymer. An extrusion molded product of such a resin composition may be used, for example.

The transparent protective film is transparent as its name suggests and preferably has no color. To be specific, the transparent protective film has a thickness direction retardation Rth of preferably −90 nm to +75 nm, more preferably −80 nm to +60 nm, and most preferably −70 nm to +45 nm. A thickness direction retardation Rth of the transparent protective film within the above ranges may resolve optical coloring of the polarizer caused by the transparent protective film.

The thickness of the transparent protective film may appropriately be set in accordance with the purpose. The transparent protective film has a thickness of typically 500 µm or less, preferably 5 to 300 µm, and furthermore preferably 5 to 150 µm.

D. Birefringent Layer Having Relationship of nx>ny=nz and Positive Uniaxial Property (First Birefringent Layer)

The first birefringent layer in the present invention has a refractive index profile of nx>ny=nz.

The first birefringent layer may function as a λ/4 plate. Such a first birefringent layer has an in-plane retardation Δnd of preferably 90 to 160 nm, more preferably 95 to 150 nm, and furthermore preferably 95 to 145 nm.

In the present invention, the phrase "having positive uniaxial property" refers to a case where an absolute value of difference between the in-plane retardation (Δnd) and the thickness direction retardation (Rth) is 10 nm or less, and preferably 8 nm or less.

The thickness of the first birefringent layer may be set such that the first birefringent layer may most appropriately function as a λ/4 plate. That is, the thickness may be set so as to provide a desired in-plane retardation. To be specific, the thickness is preferably 40 to 110 µm, more preferably 50 to 100 µm, and most preferably 60 to 90 µm.

The first birefringent layer contains a resin having an absolute value of photoelastic coefficient of preferably $2\times10^{-11}$ m$^2$/N or less, more preferably $2.0\times10^{-13}$ to $1.0\times10^{-11}$ m$^2$/N, and furthermore preferably $1.0\times10^{-12}$ to $1.0\times10^{-11}$ m$^2$/N. An absolute value of photoelastic coefficient within the above ranges hardly causes change due to contraction stress under heating. Thus, the first birefringent layer is formed by using a resin having such an absolute value of photoelastic coefficient, to thereby favorably prevent uneven heating of an image display apparatus to be obtained.

Typical examples of a resin capable of satisfying such a photoelastic coefficient include a cyclic olefin-based resin and a cellulose-based resin. The cyclic olefin-based resin is particularly preferred. The cyclic olefin-based resin is a general term for a resin prepared through polymerization of a cyclic olefin as a monomer, and examples thereof include resins described in JP 1-240517 A, JP 3-14882 A, JP 3-122137 A, and the like. Specific examples thereof include: a ring opened (co)polymer of a cyclic olefin; an addition polymer of a cyclic olefin; a copolymer (typically, a random copolymer) of a cyclic olefin, and an α-olefin such as ethylene or propylene; their graft modified products each modified with an unsaturated carboxylic acid or its derivative; and hydrides thereof. A specific example of the cyclic olefin is a norbornene-based monomer.

Examples of the norbornene-based monomer include: norbornene, and an alkyl and/or alkylidene substitute such as 5-methyl-2-norbornene, 5-dimethyl-2-norbornene, 5-ethyl-2-norbornene, 5-butyl-2-norbornene, 5-ethylidene-2-norbornene, or a derivative thereof substituted by a polar group such as a halogen; dicyclopentadiene, 2,3-dihydrodicyclopentadiene, or the like; dimethanooctahydronaphthalene, a derivative thereof substituted by alkyl and/or alkylidene, and a derivative thereof substituted by a polar group such as a halogen, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethyniliden-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, or 6-methoxycarbonyl-1,4:5,8-dimethano-1,4,4a,5,6,7,8,8a-octahydronaphthalene; and a trimer or tetramer of cyclopentadiene such as 4,9:5,8-dimethano-3a,4,4a,5,8,8a,9,9a-octahydro-1H-benzoindene, or 4,11:5,10:6,9-trimethano-3a,4,4a,5,5a,6,9,9a,10,10a,11,11a-dodecahydro-1H-cyclopentaanthracene.

In the present invention, other cycloolefins which may be subjected to ring opening polymerization may be used in combination within a range not inhibiting the effect of the present invention. A specific example of such a cycloolefin is a compound having one reactive double bond such as cyclopentene, cyclooctene, or 5,6-dihydrodicyclopentadiene.

The cyclic olefin-based resin has a number average molecular weight (Mn) preferably 25,000 to 200,000, more preferably 30,000 to 100,000, and most preferably 40,000 to 80,000 measured through a gel permeation chromatography (GPC) method by using a toluene solvent of. A number average molecular weight within the above ranges can provide excellent mechanical strength, and favorable solubility, forming property, and casting operability.

In the case where the cyclic olefin-based resin is prepared through hydrogenation of a ring opened polymer of a norbornene-based monomer, a hydrogenation rate is preferably 90% or more, more preferably 95% or more, and most preferably 99% or more. A hydrogenation rate within the above ranges can provide excellent heat degradation resistance and light degradation resistance.

Various products of the cyclic olefin-based resin are commercially available. Specific examples thereof include: "ZEONEX" and "ZEONOR", trade names, available from Zeon Corporation; "Arton", trade name, available from JSR Corporation; "Topas", trade name, available from Ticona; and "APEL", trade name, available from Mitsui Chemical Corporation.

Any appropriate cellulose-based resin (typically, an ester of cellulose and an acid) may be employed as the cellulose-based resin. An ester formed of cellulose and fatty acid is preferred. Specific examples of such cellulose-based resin include cellulose triacetate (triacetyl cellulose: TAC), cellulose diacetate, cellulose tripropionate, and cellulose dipropionate. Cellulose triacetate (triacetyl cellulose:TAC) is particularly preferred, because of its low birefringence and high transmittance. Many TAC products are commercially available, therefore TAC is also advantageous in terms of availability and cost.

Specific examples of commercially available products of TAC include: "UV-50", "UV-80", "SH-50", "SH-80", "TD-80U", "TD-TAC", and "UZ-TAC", trade names, available from Fuji Photo Film Co., Ltd.; "DC series", trade name, available from Konica Minolta Holdings, Inc.; and "Triacetyl cellulose 80 μm series" trade name, available from Lonza Japan. Of those, "TD-80U" is preferred because of excellent transmittance and durability. "TD-80U" has excellent adaptability to a liquid crystal display apparatus of TFT type, in particular.

The first birefringent layer is preferably obtained by stretching a film formed of the cyclic olefin-based resin or the cellulose-based resin. Any appropriate forming method may be employed as a method of forming a film from the cyclic olefin-based resin or the cellulose-based resin. Specific examples thereof include a compression molding method, a transfer molding method, an injecting molding method, an extrusion molding method, a blow molding method, a powder molding method, an FRP molding method, and a casting method. The extrusion molding method and the casting method are preferred because a film to be obtained may have enhanced smoothness and favorable optical evenness. Molding conditions may appropriately be set in accordance with the composition or type of resin to be used, desired properties for the first birefringent layer, and the like. Many film products of the cyclic olefin-based resin and the cellulose-based resin are commercially available, and the commercially available films may be subjected to the stretching treatment as they are.

The in-plane retardation $\Delta$nd of the first birefringent layer may preferably be controlled by changing the stretch ratio and stretching temperature of the cyclic olefin-based resin or the cellulose-based resin. The stretch ratio may vary depending on the desired in-plane retardation value and thickness for the first birefringent layer, the type of resin to be used, the thickness of a film to be used, the stretching temperature, and the like. To be specific, the stretch ratio is preferably 1.1 to 1.6 times, more preferably 1.2 to 1.55 times, and most preferably 1.25 to 1.50 times. Stretching at such a stretch ratio may provide a first birefringent layer having an in-plane retardation and appropriately exhibiting the effect of the present invention.

The stretching temperature may vary depending on the desired in-plane retardation value and thickness for the first birefringent layer, the type of resin to be used, the thickness of film to be used, the stretch ratio, and the like. To be specific, the stretching temperature is preferably 130 to 150° C., more preferably 135 to 145° C., and most preferably 137 to 143° C. Stretching at such a stretching temperature may provide a first birefringent layer having an in-plane retardation and appropriately exhibiting the effect of the present invention.

E. Lamination of First Birefringent Layer and Polarizer (First Polarizer

In the optical film of the present invention, a polarizer (first polarizer) and a birefringent layer (first birefringent layer) are laminated directly through a pressure-sensitive adhesive or an adhesive. As shown in FIG. 1 as an example, the first polarizer 30 and the first birefringent layer 60 are laminated directly through a pressure-sensitive adhesive or an adhesive.

A surface of the first birefringent layer to be laminated to the first polarizer is preferably subjected to easily adhesive treatment. The easily adhesive treatment is preferably performed by applying a resin material. Examples of the resin material include a silicon-based resin, a urethane-based resin, and an acrylic resin. An easily adhesive layer is formed through the easily adhesive treatment. The easily adhesive layer has a thickness of preferably 5 to 100 nm, and more preferably 10 to 80 nm.

The first polarizer is laminated directly on the first birefringent layer through a pressure-sensitive adhesive or an adhesive. In the case where the first birefringent layer is subjected to easily adhesive treatment, a surface of the first birefringent layer subjected to the easily adhesive treatment is laminated directly on the first polarizer through a pressure-sensitive adhesive or an adhesive. The pressure-sensitive adhesive forms a pressure-sensitive adhesive layer, and the adhesive forms an adhesive layer. The pressure-sensitive adhesive or the adhesive may be applied to the first polarizer, to the first birefringent layer, or to both the first polarizer and the first birefringent layer.

The thickness of the pressure-sensitive adhesive layer may appropriately be set in accordance with the intended use or adhesive strength. To be specific, the pressure-sensitive adhesive layer has a thickness of preferably 1 µm to 100 µm, more preferably 5 µm to 50 µm, and most preferably 10 µm to 30 µm.

Any appropriate pressure-sensitive adhesive may be employed as the pressure-sensitive adhesive forming the pressure-sensitive adhesive layer. Specific examples thereof include a solvent-type pressure-sensitive adhesive, a non-aqueous emulsion-type pressure-sensitive adhesive, an aqueous pressure-sensitive adhesive, and a hot-melt pressure-sensitive adhesive. A solvent-type pressure-sensitive adhesive containing an acrylic polymer as a base polymer is preferably used for exhibiting appropriate pressure-sensitive adhesive properties (wetness, cohesiveness, and adhesive property) with respect to the first polarizer and the first birefringent layer and providing excellent optical transparency, weatherability, and heat resistance.

The adhesive layer is formed by applying and drying an application solution containing an adhesive in a predetermined amount to a surface of the first birefringent layer and/or a surface of the first polarizer, for example. Any appropriate method may be employed as a method of preparing the application solution. For example, a commercially available solution or dispersion may be used, or a solvent may be added to the commercially available solution or dispersion and used. Alternatively, a solid content may be dissolved or dispersed in various solvents and then used.

Any adhesive having appropriate properties, form, and adhesion mechanism may be used as the adhesive depending on the purpose. Specific examples thereof include an aqueous adhesive, a solvent-type adhesive, an emulsion-type adhesive, a latex type adhesive, a mastic adhesive, a multi-layer adhesive, a paste adhesive, a foamed adhesive, and a supported-film adhesive; a thermoplastic adhesive, a heat-melting adhesive, a thermocoagulation resin, a hot-melt resin, a heat-activated resin, an adhesive for heat-sealing, a thermosetting adhesive, a contact adhesive, a pressure-sensitive adhesive, a polymerized adhesive, a solvent-type adhesive, and a solvent-activated adhesive. Of those, in the present invention, an aqueous adhesive which has excellent transparency, adhesive property, workability, and quality of a product, and is excellent in economic term is preferably used.

The aqueous adhesive contains a water-soluble natural polymer and/or synthetic polymer as the main component(s). Specific examples of the natural polymer include proteins and starch. Specific examples of the synthetic polymer include a resole resin, a urea resin, a melamine resin, polyvinyl alcohol, polyethylene oxide, polyacrylamide, polyvinyl pyrrolidone, an acrylate, and a methacrylate.

In the present invention, of the aqueous adhesives, an aqueous adhesive containing a polyvinyl alcohol-based resin as a main component is preferably used, and an aqueous adhesive containing a modified polyvinyl alcohol having an acetoacetyl group as a main component is more preferably used because of excellent adhesive property with the first polarizer and excellent adhesive property with the first birefringent layer. Specific examples of the modified polyvinyl alcohol having an acetoacetyl group include "GOHSENOL Z series" and "GOHSENOL NH series", trade names, available from Nippon Synthetic Chemical Industry Co., Ltd.

The aqueous adhesive containing a polyvinyl alcohol-based resin as a main component may further contain a crosslinking agent for further improving water resistance. Examples of the crosslinking agent include an amine compound, an aldehyde compound, a methylol compound, an epoxy compound, an isocyanate compound, and a polyvalent metal salt. In the present invention, the amine compound, the aldehyde compound, and the methylol compound are preferably used. Specific examples of the aldehyde compound include: "Glyoxal", trade name, available from Nippon Synthetic Chemical Industry Co., Ltd.; and "Sequarez 755", trade name, available from OMNOVA Solutions Inc. A specific example of the amine compound is "Methaxylenediamine", trade name, available from Mitsubishi Gas Chemical Company, Inc. A specific example of the methylol compound is "Watersol series", trade name, available from Dainippon Ink and Chemicals, Inc.

A mixing amount of the crosslinking agent is preferably 1 to 15 parts by weight, more preferably 1 to 10 parts by weight, and most preferably 1 to 7 parts by weight with respect to 100 parts by weight of the polyvinyl alcohol (preferably, the modified polyvinyl alcohol having an acetoacetyl group). A mixing amount within the above ranges allows formation of an adhesive layer having excellent transparency, adhesive property, and water resistance.

A total solid content in the adhesive may vary depending on the solubility, application viscosity, wetness, intended thickness, and the like of the adhesive. The total solid content is preferably 2 to 100 (weight ratio), more preferably 10 to 50 (weight ratio), and most preferably 20 to 40 (weight ratio) with respect to 100 of a solvent. A total solid content within the above ranges allows formation of an adhesive layer having high surface evenness.

The viscosity of the adhesive is not particularly limited, but a value measured at 23° C. and a shear speed of 1,000 (1/s) is preferably 2 to 50 (mPa·s), more preferably 2 to 30 (mPa·s), and most preferably 4 to 20 (mPa·s). A viscosity within the above ranges allows formation of an adhesive layer having high surface evenness.

Any appropriate method may be employed as a method of applying the adhesive. For example, an application method using a coater may be used. A coater to be used may appropriately be selected from the above-mentioned coaters.

A glass transition temperature (Tg) of the adhesive is not particularly limited, but is preferably 20 to 120° C., more preferably 40 to 100° C., and most preferably 50 to 90° C. Note that the glass transition temperature may be measured by differential scanning calorimetry (DSC) measurement through a method in accordance with JIS K7121-1987.

The thickness of the adhesive is not particularly limited, but is preferably 0.01 to 0.15 µm, more preferably 0.02 to 0.12 µm, and most preferably 0.03 to 0.09 µm. A thickness within the above ranges allows formation of a polarizing plate having excellent durability and preventing peeling or floating of a polarizer even when the polarizing plate of the present invention is exposed to high temperature and high humidity environment.

F. Birefringent Layer Having Relationship of $nx \geq ny > nz$ (Second Birefringent Layer)

The second birefringent layer has a relationship of $nx \geq ny > nz$. That is, the second birefringent layer has a relationship of $nx = ny > nz$ or $nx > ny > nz$. The second birefringent layer may be a monolayer or a laminate of two or more layers. In the laminate, a material used for forming each layer and a thickness of each layer may appropriately be set as long as the laminate as a whole has the above-mentioned optical properties.

In the case where the second birefringent layer has a relationship of nx=ny>nz, the second birefringent layer serves as a so-called negative C plate. The second birefringent layer having such a refractive index profile allows favorable compensation of birefringence of a liquid crystal layer of a liquid crystal cell of VA mode, in particular. As a result, a liquid crystal display apparatus having significantly improved viewing angle properties may be obtained. As described above, in the specification of the present invention the expression "nx=ny" not only refers to a case where nx and ny are exactly equal but also includes a case where nx and ny are substantially equal. Thus, the second birefringent layer may have an in-plane retardation and a slow axis. An allowable in-plane retardation Δnd for the negative C plate in practical use is preferably 0 to 20 nm, more preferably 0 to 10 nm, and furthermore preferably 0 to 5 nm.

The thickness direction retardation Rth of the second birefringent layer having a relationship of nx=ny>nz is preferably 30 to 300 nm, more preferably 60 to 250 nm, furthermore preferably 80 to 230 nm, and most preferably 100 to 200 nm. The thickness of the second birefringent layer providing such a thickness direction retardation may vary depending on a material to be used and the like. For example, the second birefringent layer has a thickness of preferably 1 to 50 μm, more preferably 1 to 20 μm, and most preferably 1 to 15 μm. A second birefringent layer formed of a cholesteric alignment fixed layer alone as described below has a thickness of preferably 1 to 10 μm, more preferably 1 to 8 μm, and most preferably 1 to 5 μm. Such a thickness is smaller than the thickness of the negative C plate (60 μm or more, for example) obtained through biaxial stretching, and may greatly contribute to reduction in thickness of an image display apparatus. The second birefringent layer is formed to have a very small thickness, to thereby significantly prevent uneven heating. Such an optical compensation layer having a very small thickness is preferred from the viewpoints of preventing disturbance in cholesteric alignment or reduction in transmittance, selective reflection property, color protection, productivity, and the like. The second birefringent layer (negative C plate) is formed from any appropriate material as long as the above-mentioned thickness and optical properties can be obtained. Preferably, a negative C plate having such a very small thickness is realized by forming cholesteric alignment using a liquid crystalline material and fixing the cholesteric alignment, that is, by using a cholesteric alignment fixed layer (details of a material used for forming the cholesteric alignment and a method of fixing the cholesteric alignment are described below).

Preferably, the second birefringent layer having a relationship of nx=ny>nz is formed of a cholesteric alignment fixed layer having a selective reflection wavelength region of 350 nm or less. An upper limit of the selective reflection wavelength region is more preferably 320 nm or less, and most preferably 300 nm or less. Meanwhile, a lower limit of the selective reflection wavelength region is preferably 100 nm or more, and more preferably 150 nm or more. If a selective reflection wavelength region is more than 350 nm, the selective reflection wavelength region covers a visible light range and thus may cause a problem such as coloring or decoloring. If a selective reflection wavelength region is less than 100 nm, and amount of a chiral agent (described below) to be used increases excessively and thus a temperature during formation of an optical compensation layer must be controlled accurately. As a result, a polarizing plate may hardly be produced.

A helical pitch in the cholesteric alignment fixed layer is preferably 0.01 to 0.25 μm, more preferably 0.03 to 0.20 μm, and most preferably 0.05 to 0.15 μm. A helical pitch of 0.01 μm or more provides sufficient alignment property, for example. A helical pitch of 0.25 μm or less allows sufficient suppression of rotary polarization in a short wavelength side of visible light, to thereby sufficiently prevent light leak and the like. The helical pitch may be controlled by adjusting the type (twist strength) and amount of the chiral agent as described below. The helical pitch may be adjusted, to thereby control the selective reflection wavelength region within a desired range.

Alternatively, the second birefringent layer having a relationship of nx=ny>nz may have a laminate structure of the cholesteric alignment fixed layer and a layer (also referred to as a plastic film layer in the specification of the present invention) having a relationship of nx=ny>nz and containing a resin having an absolute value of photoelastic coefficient of $2 \times 10^{-11}$ m$^2$/N or less. Typical examples of a material capable of forming the plastic film layer (resin capable of satisfying such a photoelastic coefficient) include a cyclic olefin-based resin and a cellulose-based resin. Details of the cyclic olefin-based resin and the cellulose-based resin are described in the above section C. A cellulose-based resin film (typically, a TAC film) is a film having a relationship of nx=ny>nz.

The second birefringent layer having a relationship of nx=ny>nz may be subjected to stretching or contraction, to thereby convert into a second birefringent layer having a relationship of nx>ny>nz.

An in-plane retardation (transverse retardation) Δnd of the second birefringent layer having a relationship of nx>ny>nz may be optimized corresponding to display mode of the liquid crystal cell. A lower limit of Δnd is preferably 5 nm or more, more preferably 10 nm or more, and most preferably 15 nm or more. Δnd of less than 5 nm often provides reduced contrast in an oblique direction. Meanwhile, an upper limit of Δnd is preferably 400 nm or less, more preferably 300 nm or less, furthermore preferably 200 nm or less, particularly preferably 150 nm or less, especially preferably 100 nm or less, and most preferably 80 nm or less. Δnd of more than 400 nm often provides a small viewing angle. To be specific, a liquid crystal cell of VA mode has Δnd of preferably 5 to 150 nm, more preferably 10 to 100 nm, and most preferably 15 to 80 nm. A liquid crystal cell of OCB mode has Δnd of preferably 5 to 400 nm, more preferably 10 to 300 nm, and most preferably 15 to 200 nm.

A thickness direction retardation Rth of the second birefringent layer having a relationship of nx>ny>nz may be optimized corresponding to display mode of the liquid crystal cell. A lower limit of Rth is preferably 10 nm or more, more preferably 20 nm or more, and most preferably 50 nm or more. Rth of less than 10 nm often provides reduced contrast in an oblique direction. Meanwhile, an upper limit of Rth is preferably 1,000 nm or less, more preferably 500 nm or less, furthermore preferably 400 nm or less, particularly preferably 300 nm or less, especially preferably 280 nm or less, and most preferably 260 nm or less. Rth of more than 1,000 nm may excessively increase optical compensation to reduce contrast in an oblique direction.

A liquid crystal cell of VA mode has Rth of preferably 10 to 300 nm, more preferably 20 to 280 nm, and most preferably 50 to 260 nm.

A liquid crystal cell of OCB mode has Rth of preferably 10 to 1,000 nm, more preferably 20 to 500 nm, and most preferably 50 to 400 nm.

Any appropriate thickness may be employed as the thickness of the second birefringent layer having a relationship of nx>ny>nz as long as the effect of the present invention can be provided. Typically, the second birefringent layer having a relationship of nx>ny>nz has a thickness of preferably 0.1 to 50 μm, more preferably 0.5 to 30 μm, and furthermore preferably 1 to 20 μm for contributing to reduction in thickness of a liquid crystal display apparatus and for providing an optical compensation layer exhibiting excellent viewing angle compensation performance and having even retardation.

Any appropriate material may be employed as a material for forming the second birefringent layer having a relationship of nx=ny>nz or nx>ny>nz as long as the above-mentioned optical properties can be obtained. An example of such a material is a non-liquid crystalline material. A particularly preferred example thereof is a non-liquid crystalline polymer. Such a non-liquid crystalline material differs from a liquid crystalline material and may form a film having optical uniaxial property represented by nx>ny or ny>nz owing to its property, regardless of alignment property of a substrate. As a result, not only an aligned substrate, but also an unaligned substrate may be used. Further, in the case where the unaligned substrate is used, a step of applying an aligned film on a surface of the unaligned substrate, a step of laminating the aligned film, and the like may be omitted.

A preferred example of the non-liquid crystalline material includes a polymer such as polyamide, polyimide, polyester, polyether ketone, polyamide imide, or polyesterimide since such a material has excellent thermal resistance, excellent chemical resistance, excellent transparency, and sufficient rigidity. One type of polymer may be used, or a mixture of two or more types thereof having different functional groups such as a mixture of polyaryletherketone and polyamide may be used. Of those, polyimide is particularly preferred in view of high transparency, high alignment ability, and high extension.

A molecular weight of the polymer is not particularly limited. However, the polymer has a weight average molecular weight (Mw) of preferably within a range of 1,000 to 1,000,000, more preferably within a range of 2,000 to 500,000, for example.

Polyimide which has high in-plane alignment ability and which is soluble in an organic solvent is preferred as polyimide used in the present invention, for example. More specifically, a polymer disclosed in JP 2000-511296 A, containing a condensation polymerization product of 9,9-bis (aminoaryl) fluorene and aromatic tetracarboxylic dianhydride, and containing at least one repeating unit represented by the following formula (1) can be used.

In the above formula (1), $R^3$ to $R^6$ independently represent at least one type of substituent selected from hydrogen, a halogen, a phenyl group, a phenyl group substituted with 1 to 4 halogen atoms or 1 to 4 alkyl groups each having 1 to 10 carbon atoms, and an alkyl group having 1 to 10 carbon atoms. Preferably, $R^3$ to $R^6$ independently represent at least one type of substituent selected from a halogen, a phenyl group, a phenyl group substituted with 1 to 4 halogen atoms or 1 to 4 alkyl groups each having 1 to 10 carbon atoms, and an alkyl group having 1 to 10 carbon atoms.

In the above formula (1), Z represents a tetravalent aromatic group having 6 to 20 carbon atoms, and preferably represents a pyromellitic group, a polycyclic aromatic group, a derivative of the polycyclic aromatic group, or a group represented by the following formula (2), for example.

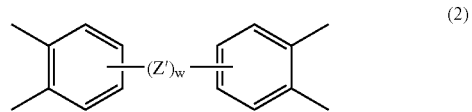

(2)

In the above formula (2), Z' represents a covalent bond, a $C(R^7)_2$ group, a CO group, an O atom, an S atom, an $SO_2$ group, an Si $(C_2H_5)_2$ group, or an $NR^8$ group. A plurality of Z's may be the same or different from each other. w represents an integer of 1 to 10. $R^7$s independently represent hydrogen or a C $(R^9)_3$ group. $R^8$ represents hydrogen, an alkyl group having 1 to about 20 carbon atoms, or an aryl group having 6 to 20 carbon atoms. A plurality of $R^8$s may be the same or different from each other. $R^9$s independently represent hydrogen, fluorine, or chlorine.

An example of the polycyclic aromatic group includes a tetravalent group derived from naphthalene, fluorene, benzofluorene, or anthracene. An example of the substituted derivative of the polycyclic aromatic group includes the above polycyclic aromatic group substituted with at least a group selected from an alkyl group having 1 to 10 carbon atoms, a fluorinated derivative thereof, and a halogen such as F or Cl.

Other examples of the polyimide include: a homopolymer disclosed in JP 08-511812 A and containing a repeating unit represented by the following general formula (3) or (4); and polyimide disclosed therein and containing a repeating unit represented by the following general formula (5). Note that, polyimide represented by the following formula (5) is a preferred form of the homopolymer represented by the following formula (3).

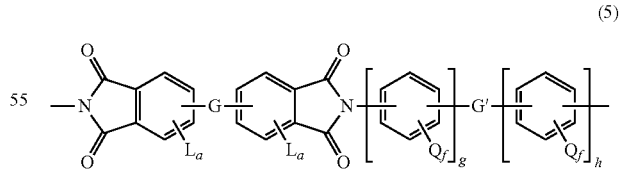

(5)

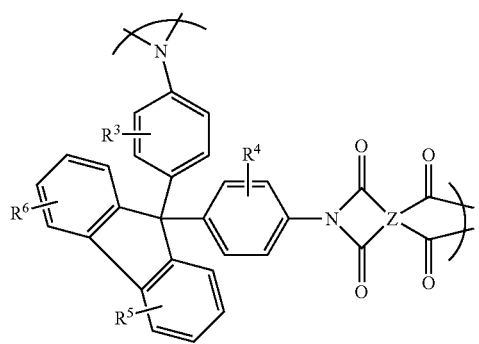

(1)

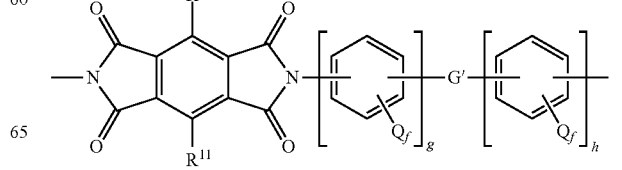

(4)

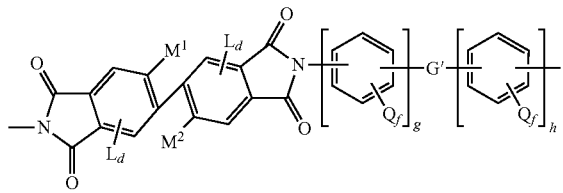 (5)

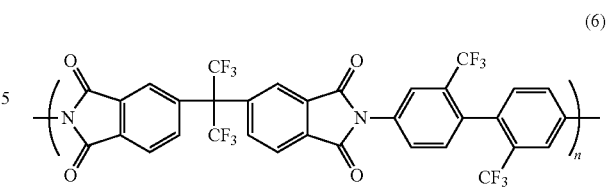 (6)

In the above general formulae (3) to (5), G and G' independently represent a covalent bond, a $CH_2$ group, a $C(CH_3)_2$ group, a $C(CF_3)_2$ group, a $C(CX_3)_2$ group (wherein, X represents a halogen), a CO group, an O atom, an S atom, an $SO_2$ group, an $Si(CH_2CH_3)_2$ group, or an $N(CH_3)$ group, for example. G and G' may be the same or different from each other.

In the above formulae (3) and (5), L is a substituent, and d and e each represent the number of the substituents. L represents a halogen, an alkyl group having 1 to 3 carbon atoms, a halogenated alkyl group having 1 to 3 carbon atoms, a phenyl group, or a substituted phenyl group, for example. A plurality of Ls may be the same or different from each other. An example of the substituted phenyl group includes a substituted phenyl group having at least one type of substituent selected from a halogen, an alkyl group having 1 to 3 carbon atoms, and a halogenated alkyl group having 1 to 3 carbon atoms, for example. Examples of the halogen include fluorine, chlorine, bromine, and iodine. d represents an integer of 0 to 2, and e represents an integer of 0 to 3.

In the above formulae (3) to (5), Q is a substituent, and f represents the number of the substituents. Q represents an atom or a group selected from hydrogen, a halogen, an alkyl group, a substituted alkyl group, a nitro group, a cyano group, a thioalkyl group, an alkoxy group, an aryl group, a substituted aryl group, an alkyl ester group, and a substituted alkyl ester group, for example. A plurality of Qs may be the same or different from each other. Examples of the halogen include fluorine, chlorine, bromine, and iodine. An example of the substituted alkyl group includes a halogenated alkyl group. An example of the substituted aryl group includes a halogenated aryl group. f represents an integer of 0 to 4, and g represents an integer of 0 to 3. h represents an integer of 1 to 3. g and h are each preferably larger than 1.

In the above formula (4), $R^{10}$ and $R^{11}$ independently represent an atom or a group selected from hydrogen, a halogen, a phenyl group, a substituted phenyl group, an alkyl group, and a substituted alkyl group. Preferably, $R^{10}$ and $R^{11}$ independently represent a halogenated alkyl group.

In the above formula (5), $M^1$ and $M^2$ independently represent a halogen, an alkyl group having 1 to 3 carbon atoms, a halogenated alkyl group having 1 to 3 carbon atoms, a phenyl group, or a substituted phenyl group, for example. Examples of the halogen include fluorine, chlorine, bromine, and iodine. An example of the substituted phenyl group includes a substituted phenyl group having at least one type of substituent selected from the group consisting of a halogen, an alkyl group having 1 to 3 carbon atoms, and a halogenated alkyl group having 1 to 3 carbon atoms.

A specific example of the polyimide represented by the above formula (3) includes a compound represented by the following formula (6).

Another example of the polyimide includes a copolymer prepared through arbitrary copolymerization of acid dianhydride having a skeleton (repeating unit) other than that as described above and diamine.

An example of the acid dianhydride includes an aromatic tetracarboxylic dianhydride. Examples of the aromatic tetracarboxylic dianhydride include pyromellitic dianhydride, benzophenone tetracarboxylic dianhydride, naphthalene tetracarboxylic dianhydride, heterocyclic aromatic tetracarboxylic dianhydride, and 2,2'-substituted biphenyltetracarboxylic dianhydride.

Examples of the pyromellitic dianhydride include: pyromellitic dianhydride; 3,6-diphenyl pyromellitic dianhydride; 3,6-bis(trifluoromethyl)pyromellitic dianhydride; 3,6-dibromopyromellitic dianhydride; and 3,6-dichloropyromellitic dianhydride. Examples of the benzophenone tetracarboxylic dianhydride include: 3,3',4,4'-benzophenone tetracarboxylic dianhydride; 2,3,3',4'-benzophenone tetracarboxylic dianhydride; and 2,2',3,3'-benzophenonetetracarboxylic-dianhydride. Examples of the naphthalene tetracarboxylic dianhydride include: 2,3,6,7-naphthalene tetracarboxylic dianhydride; 1,2,5,6-naphthalene tetracarboxylic dianhydride; and 2,6-dichloronaphthalene-1,4,5,8-tetracarboxylic dianhydride. Examples of the heterocyclic aromatic tetracarboxylic dianhydride include: thiophene-2,3,4,5-tetracarboxylic dianhydride; pyrazine-2,3,5,6-tetracarboxylic dianhydride; and pyridine-2,3,5,6-tetracarboxylic dianhydride. Examples of the 2,2'-substituted biphenyltetracarboxylic dianhydride include: 2,2'-dibromo-4,4',5,5'-biphenyltetracarboxylic dianhydride; 2,2'-dichloro-4,4',5,5'-biphenyltetracarboxylic dianhydride; and 2,2'-bis(trifluoromethyl)-4,4',5,5'-biphenyltetracarboxylic dianhydride.

Further examples of the aromatic tetracarboxylic dianhydride include: 3,3',4,4'-biphenyltetracarboxylic dianhydride; bis(2,3-dicarboxyphenyl)methane dianhydride; bis(2,5,6-trifluoro-3,4-dicarboxyphenyl)methane dianhydride; 2,2-bis(3,4-dicarboxyphenyl)-1,1,1,3,3,3-hexafluoropropane dianhydride; 4,4'-bis(3,4-dicarboxyphenyl)-2,2-diphenylpropane dianhydride; bis(3,4-dicarboxyphenyl)ether dianhydride; 4,4'-oxydiphthalic dianhydride; bis(3,4-dicarboxyphenyl)sulfonic dianhydride; 3,3',4,4'-diphenylsulfone tetracarboxylic dianhydride; 4,4'-[4,4'-isopropylidene-di(p-phenyleneoxy)]bis(phthalic anhydride); N,N-(3,4-dicarboxyphenyl)-N-methylamine dianhydride; and bis(3,4-dicarboxyphenyl)diethylsilane dianhydride.

Of those, the aromatic tetracarboxylic dianhydride is preferably 2,2'-substituted biphenyltetracarboxylic dianhydride, more preferably 2,2'-bis(trihalomethyl)-4,4',5,5'-biphenyltetracarboxylic dianhydride, and furthermore preferably 2,2'-bis(trifluoromethyl)-4,4',5,5'-biphenyltetracarboxylic dianhydride.

An example of the diamine includes aromatic diamine. Specific examples of the aromatic diamine include benzene diamine, diaminobenzophenone, naphthalene diamine, heterocyclic aromatic diamine, and other aromatic diamines.

Examples of the benzene diamine include benzene diamines such as o-, m-, or p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone include 2,2'-diaminobenzophenone and 3,3'-diaminobenzophenone. Examples of the naphthalene diamine include 1,8-diaminonaphthalene and 1,5-diaminonaphthalene. Examples of the heterocyclic aromatic diamine include 2,6-diaminopyridine, 2,4-diaminopyridine, and 2,4-diamino-S-triazine.

Further examples of the aromatic diamine include: 4,4'-diaminobiphenyl; 4,4'-diaminodiphenylmethane; 4,4'-(9-fluorenylidene)-dianiline; 2,2'-bis(trifluoromethyl)-4,4'-diaminobiphenyl; 3,3'-dichloro-4,4'-diaminodiphenylmethane; 2,2'-dichloro-4,4'-diaminobiphenyl; 2,2',5,5'-tetrachlorobenzidine; 2,2-bis(4-aminophenoxyphenyl)propane; 2,2-bis(4-aminophenyl)propane; 2,2-bis(4-aminophenyl)-1,1,1,3,3,3-hexafluoropropane; 4,4'-diaminodiphenyl ether; 3,4'-diaminodiphenyl ether; 1,3-bis(3-aminophenoxy)benzene; 1,3-bis(4-aminophenoxy)benzene; 1,4-bis(4-aminophenoxy)benzene; 4,4'-bis(4-aminophenoxy)biphenyl; 4,4'-bis(3-aminophenoxy)biphenyl; 2,2-bis[4-(4-aminophenoxy)phenyl]propane; 2,2-bis[4-(4-aminophenoxy)phenyl]-1,1,1,3,3,3-hexafluoropropan e; 4,4'-diaminodiphenyl thioether; and 4,4'-diaminodiphenylsulfone.

An example of the polyether ketone includes polyaryletherketone disclosed in JP 2001-049110 A and represented by the following general formula (7).

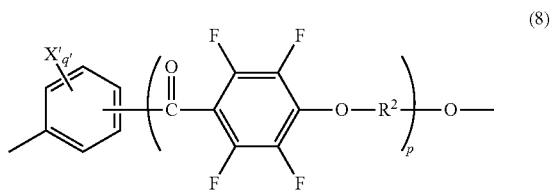

In the above formula (7), X represents a substituent, and q represents the number of the substituents. X represents a halogen atom, a lower alkyl group, a halogenated alkyl group, a lower alkoxy group, or a halogenated alkoxy group, for example. A plurality of Xs may be the same or different from each other.

Examples of the halogen atom include a fluorine atom, a bromine atom, a chlorine atom, and an iodine atom. Of those, a fluorine atom is preferred. The lower alkyl group is preferably an alkyl group having a straight chain or branched chain of 1 to 6 carbon atoms, more preferably an alkyl group having a straight chain or branched chain of 1 to 4 carbon atoms. More specifically, the lower alkyl group is preferably a methyl group, an ethyl group, a propyl group, an isopropyl group, a butyl group, an isobutyl group, a sec-butyl group, or a tert-butyl group, and particularly preferably a methyl group or an ethyl group. An example of the halogenated alkyl group includes a halide of the above lower alkyl group such as a trifluoromethyl group. The lower alkoxy group is preferably an alkoxy group having a straight chain or branched chain of 1 to 6 carbon atoms, more preferably an alkoxy group having a straight chain or branched chain of 1 to 4 carbon atoms. More specifically, the lower alkoxy group is preferably a methoxy group, an ethoxy group, a propoxy group, an isopropoxy group, a butoxy group, an isobutoxy group, a sec-butoxy group, or a tert-butoxy group, and particularly preferably a methoxy group or an ethoxy group. An example of the halogenated alkoxy group includes a halide of the above lower alkoxy group such as a trifluoromethoxy group.

In the above formula (7), q is an integer of 0 to 4. In the above formula (7), preferably, q=0, and a carbonyl group and an oxygen atom of ether bonded to both ends of a benzene ring are located in para positions.

In the above formula (7), $R^1$ is a group represented by the following formula (8), and m is an integer of 0 or 1.

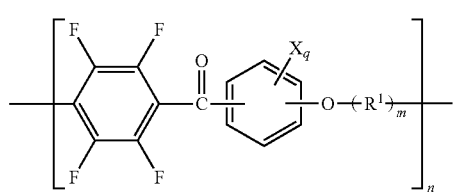

In the above formula (8), X' represents a substituent which is the same as X in the above formula (7), for example. In the above formula (8), a plurality of X's may be the same or different from each other. q' represents the number of the substituents X'. q' is an integer of 0 to 4, and q' is preferably 0. p is an integer of 0 or 1.

In the above formula (8), $R^2$ represents a divalent aromatic group. Examples of the divalent aromatic group include: an o-, m-, or p-phenylene group; and a divalent group derived from naphthalene, biphenyl, anthracene, o-, m-, or p-terphenyl, phenanthrene, dibenzofuran, biphenyl ether, or biphenyl sulfone. In the divalent aromatic group, hydrogen directly bonded to an aromatic group may be substituted with a halogen atom, a lower alkyl group, or a lower alkoxy group. Of those, $R^2$ is preferably an aromatic group selected from groups represented by the following formulae (9) to (15).

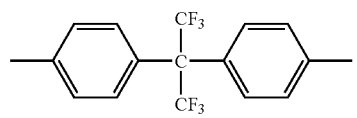

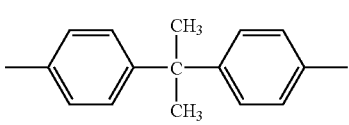

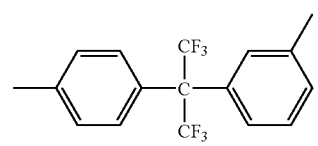

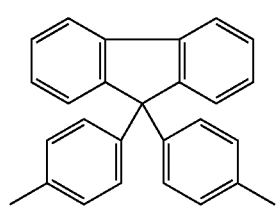

(13)

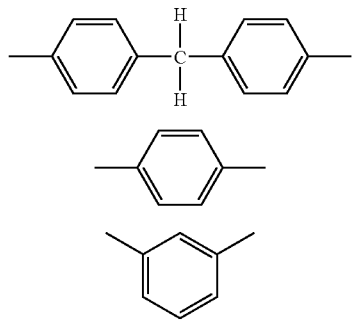

(14)

(15)

In the above formula (7), $R^1$ is preferably a group represented by the following formula (16). In the following formula (16), $R^2$ and p are defined as those in the above formula (8).

(16)

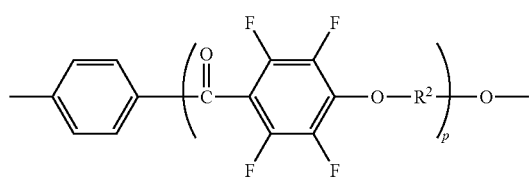

In the above formula (7), n represents a degree of polymerization. n falls within a range of 2 to 5,000, preferably within a range of 5 to 500, for example. Polymerization may involve polymerization of repeating units of the same structure or polymerization of repeating units of different structures. In the latter case, a polymerization form of the repeating units may be block polymerization or random polymerization.

Terminals of the polyaryletherketone represented by the above formula (7) are preferably a fluorine atom on a p-tetrafluorobenzoylene group side and a hydrogen atom on an oxyalkylene group side. Such polyaryletherketone can be represented by the following general formula (17), for example. In the following formula (17), n represents the same degree of polymerization as that in the above formula (7).

(17)

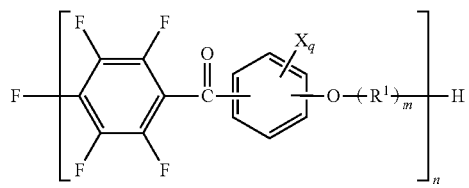

Specific examples of the polyaryletherketone represented by the above formula (7) include compounds represented by the following formulae (18) to (21). In each of the following formulae, n represents the same degree of polymerization as that in the above formula (7).

(18)

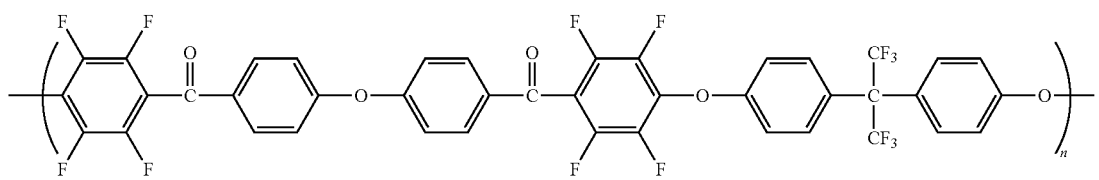

(19)

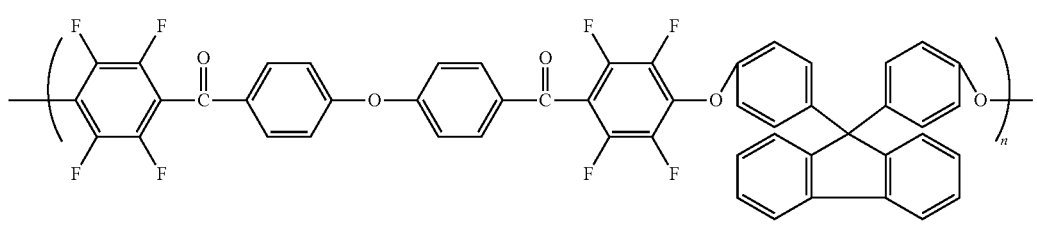

(20)

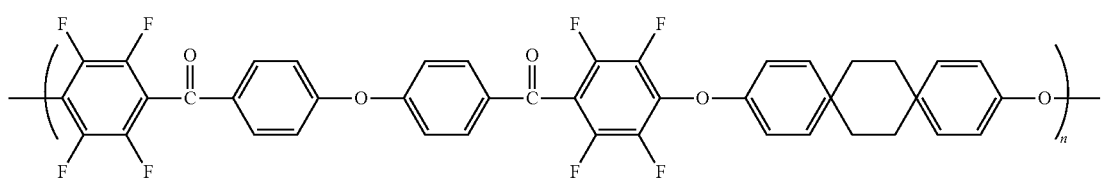

(21)

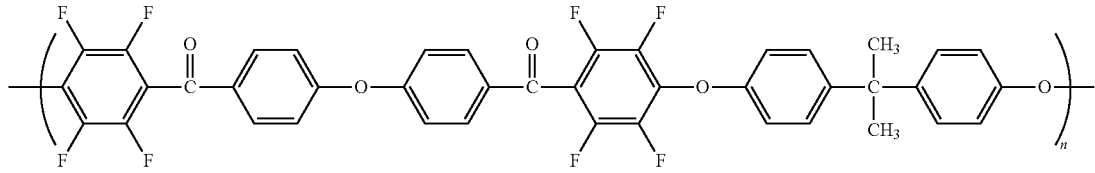

In addition, an example of polyamide or polyester includes polyamide or polyester disclosed in JP 10-508048 A. A repeating unit thereof can be represented by the following general formula (22), for example.

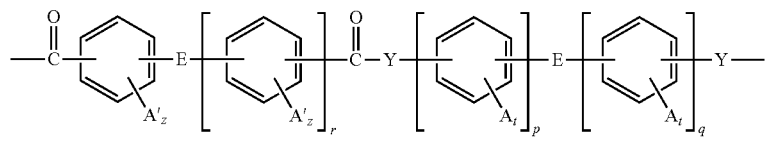

(22)

In the above formula (22), Y represents O or NH. E represents at least one selected from a covalent bond, an alkylene group having 2 carbon atoms, a halogenated alkylene group having 2 carbon atoms, a $CH_2$ group, a $C(CX_3)_2$ group (wherein, X is a halogen or hydrogen), a CO group, an O atom, an S atom, an $SO_2$ group, an $Si(R)_2$ group, and an N(R) group, for example. A plurality of Es may be the same or different from each other. In E, R is at least one of an alkyl group having 1 to 3 carbon atoms and a halogenated alkyl group having 1 to 3 carbon atoms, and is located in a meta or para position with respect to a carbonyl functional group or a Y group.

In the above formula (22), A and A' each represent a substituent, and t and z represent the numbers of the respective substituents. p represents an integer of 0 to 3, and q represents an integer of 1 to 3. r represents an integer of 0 to 3.

A is selected from hydrogen, a halogen, an alkyl group having 1 to 3 carbon atoms, a halogenated alkyl group having 1 to 3 carbon atoms, an alkoxy group represented by OR (wherein, R is defined as above), an aryl group, a substituted aryl group prepared through halogenation or the like, an alkoxycarbonyl group having 1 to 9 carbon atoms, an alkylcarbonyloxy group having 1 to 9 carbon atoms, an aryloxycarbonyl group having 1 to 12 carbon atoms, an arylcarbonyloxy group having 1 to 12 carbon atoms and its substituted derivatives, an arylcarbamoyl group having 1 to 12 carbon atoms, and arylcarbonylamino group having 1 to 12 carbon atoms and its substituted derivatives, for example. A plurality of As may be the same or different from each other. A' is selected from a halogen, an alkyl group having 1 to 3 carbon atoms, a halogenated alkyl group having 1 to 3 carbon atoms, a phenyl group, and a substituted phenyl group, for example. A plurality of A's may be the same or different from each other. Examples of the substituent on a phenyl ring of the substituted phenyl group include a halogen, an alkyl group having 1 to 3 carbon atoms, a halogenated alkyl group having 1 to 3 carbon atoms, and the combination thereof. t represents an integer of 0 to 4, and z represents an integer of 0 to 3.

The repeating unit of the polyamide or polyester represented by the above formula (22) is preferably a repeating unit represented by the following general formula (23).

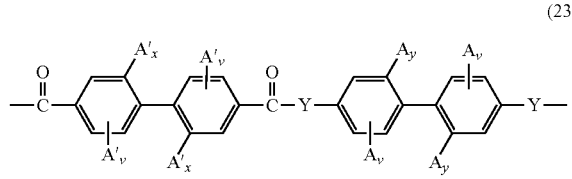

(23)

In the above formula (23), A, A', and Y are defined as those in the above formula (22). v represents an integer of 0 to 3, preferably an integer of 0 to 2. x and y are each 0 or 1, but are not both 0.

Next, description will be given of a method of producing the second birefringent layer. Any appropriate method may be employed as the method of producing the second birefringent layer as long as the effect of the present invention can be provided.

A solution of at least one polymer selected from the group consisting of polyamide, polyimide, polyester, polyether ketone, polyamide imide, and polyesterimide is applied to a transparent polymer film and is dried to form the polymer layer on the transparent polymer film, to thereby obtain the second birefringent layer having a relationship of nx=ny>nz. Then, the transparent polymer film and the polymer layer may be stretched or contracted integrally, to thereby obtain the second birefringent layer having a relationship of nx>ny>nz.

Examples of the solvent of the coating solution (a polymer solution to be applied to a transparent polymer film) include, but not limited to: halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene; phenols such as phenol and parachlorophenol; aromatic hydrocarbons such as benzene, toluene, xylene, methoxybenzene, and 1,2-dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerine, ethylene glycol, triethylene glycol, ethylene glycol monomethylether, diethylene glycol dimethylether, propylene glycol, dipropylene glycol, and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether, and tetrahydrofuran; carbon disulfide; ethyl cellosolve; and butyl cellosolve. Of those, methyl isobutyl ketone is preferred, because non-liquid crystal materials exhibits high solubility in the solvent and the solvent does not corrode the substrate. Each of those solvents can be used alone, or two or more of them can be used in combination.

The application solution may have any appropriate concentration of the non-liquid crystalline polymer as long as the above-mentioned optical compensation layer can be obtained and the application solution may be applied. For example, the solution contains preferably 5 to 50 parts by weight, and more preferably 10 to 40 parts by weight of the non-liquid crystalline polymer with respect to 100 parts by weight of the solvent. The solution having a concentration within the above ranges has a viscosity allowing easy application.

The application solution may further contain various additives such as a stabilizer, a plasticizer, and metals as required.

The application solution may further contain another different resin as required. Examples of another different resin include various general-purpose resins, engineering plastics, a thermoplastic resin, and a thermosetting resin. Such a resin is used in combination, to thereby allow formation of an optical compensation layer having appropriate mechanical strength or durability in accordance with the purpose.

Examples of the general-purpose resin include polyethylene (PE), polypropylene (PP), polystyrene (PS), polymethylmethacrylate (PMMA), an ABS resin, and an AS resin. Examples of the engineering plastic include polyacetate (POM), polycarbonate (PC), polyamide (PA: nylon), polyethylene terephthalate (PET), and polybutylene terephthalate (PBT). Examples of the thermoplastic resin include polyphenylene sulfide (PPS), polyether sulfone (PES), polyketone (PK), polyimide (PI), polycyclohexane dimethanol terephthalate (PCT), polyallylate (PAR), and a liquid crystal polymer (LCP). Examples of the thermosetting resin include an epoxy resin and a phenol novolac resin.

The type and amount of another different resin to be added to the application solution may appropriately be set in accordance with the purpose. For example, such a resin is added to the non-liquid crystalline polymer in a ratio of preferably 0 to 50 mass %, and more preferably 0 to 30 mass %.

Examples of a method of applying the solution include: a spin coating method; a roll coating method; a flow coating method; a printing method; a dip coating method; a flow casting method; a bar coating method; and a gravure printing method. For application, a polymer layer superposition method may also be used as required.

After application, the solvent in the above-mentioned solution is evaporated and removed by drying such as natural drying, air drying, or heat drying (at 60 to 250° C., for example), to thereby form a film-like optical compensation layer.

The second birefringent layer having a relationship of $nx=ny>nz$ is preferably obtained by: applying a solution of at least one polymer selected from the group consisting of polyamide, polyimide, polyester, polyether ketone, polyamide imide, and polyesterimide to a transparent polymer film; and drying the whole to form the polymer layer on the transparent polymer film. As described above, a laminate (hereinafter, may be referred to as a laminate A) including the second birefringent layer having a relationship of $nx=ny>nz$ formed on the transparent polymer film may be obtained.

The second birefringent layer having a relationship of $nx>ny>nz$ is obtained by: applying a solution of at least one polymer selected from the group consisting of polyamide, polyimide, polyester, polyether ketone, polyamide imide, and polyesterimide to a transparent polymer film; drying the whole to form the polymer layer on the transparent polymer film; and stretching or contracting the transparent polymer film and the polymer layer integrally. To be specific, as a method involving contraction, the above-mentioned solution is applied to the transparent polymer film subjected to stretching treatment and is dried, to thereby contract the transparent polymer film and the polymer layer integrally and attain optical biaxial property. As a method involving stretching, the above-mentioned solution is applied to the unstretched transparent polymer film and is dried, and the whole is stretched under heating, to thereby stretch the transparent polymer film and the polymer layer integrally and attain optical biaxial property. In this way, the laminate (hereinafter, may be referred to as laminate B) including the second birefringent layer having a relationship of $nx>ny>nz$ formed on the transparent polymer film may be obtained.

A film similar to a protective film (transparent protective film) for a polarizer may be used as the transparent polymer film.

The second birefringent layer may be used by peeling the second birefringent layer from the thus-obtained laminate A or B (laminate including the second birefringent layer formed on the transparent polymer film), or may be used as the laminate A or B. In the case where the laminate A or B as it is further laminated with a polarizer, the transparent polymer film in the laminate A or B may act as a protective film (transparent protective film) for the polarizer.

G. Lamination of Second Birefringent Layer and Polarizer (Second Polarizer

In the liquid crystal panel of the present invention, the second birefringent layer and the second polarizer are preferably laminated. As shown in FIG. 1, in a preferred mode of the liquid crystal panel, the second transparent protective film 11 of the second polarizer 50, including the second transparent protective film 11 on one side and the third transparent protective film 12 on another side, is laminated on the second birefringent layer 70.

Any appropriate method may be employed as a method of laminating the second birefringent layer and the polarizer (second polarizer). However, a preferred method involves laminating a transparent polymer film side of the laminate (laminate A or laminate B) including the second birefringent layer on the transparent polymer film, with the second polarizer. In this case, the transparent polymer film may act as a transparent protective film for the second polarizer.

Any appropriate lamination method (bonding, for example) may be employed as the method of laminating the transparent polymer film and the second polarizer. The bonding may be performed by using any appropriate adhesive or pressure-sensitive adhesive. The type of adhesive or pressure-sensitive adhesive may appropriately selected in accordance with the type of adherend (that is, the transparent protective film or the polarizer). Specific examples of the adhesive include: polymer adhesives such as an acrylic adhesive, a vinyl alcohol-based adhesive, a silicone-based adhesive, a polyester-based adhesive, a polyurethane-based adhesive, and a polyether-based adhesive; isocyanate-based adhesives; and rubber-based adhesives. Specific examples of the pressure-sensitive adhesive include an acrylic pressure-sensitive adhesive, a vinyl alcohol-based pressure-sensitive adhesive, a silicone-based pressure-sensitive adhesive, a polyester-based pressure-sensitive adhesive, a polyurethane-based pressure-sensitive adhesive, a polyether-based pressure-sensitive adhesive, an isocyanate-based pressure-sensitive adhesive, and a rubber-based pressure-sensitive adhesive.

The thickness of the adhesive or pressure-sensitive adhesive is not particularly limited, but is preferably 10 to 200 nm, more preferably 30 to 180 nm, and most preferably 50 to 150 nm.

In the present invention, a continuous transparent polymer film and a continuous polarizer (second polarizer) may be attached together continuously with respective longitudinal directions aligned, to thereby obtain an optical film at very high production efficiency. In this method, the film needs not be cut-out obliquely with respect to a longitudinal direction (stretching direction) for lamination. As a result, no variation occurs in angle of an optical axis of a cut-out film, and an optical film without variation in quality can be obtained as a product. Further, no waste due to cutting-out is generated, and an optical film can be obtained at low cost. In addition, production of a large-scale polarizing plate is facilitated.

H. Lamination of Liquid Crystal Cell, and First Birefringent Layer or Second Birefringent Layer A surface of the first birefringent layer or second birefringent layer to be laminated to the liquid crystal cell preferably includes a pressure-sensitive adhesive layer for bonding with the liquid crystal cell.

A pressure-sensitive adhesive used for forming the pressure-sensitive adhesive layer is not particularly limited. However, a pressure-sensitive adhesive containing a polymer such as an acrylic polymer, a silicone-based polymer, polyester, polyurethane, polyamide, polyether, a fluorine-based polymer, or a rubber-based polymer as a base polymer may appropriately be selected and used. In particular, a pressure-sensitive adhesive such as an acrylic pressure-sensitive adhesive having excellent optical transparency, moderate pressure-sensitive adhesive properties such as wetness, cohesiveness, and adhesive property, and excellent weatherability, heat resistance, and the like may preferably be used. In particular, an acrylic pressure-sensitive adhesive formed of an acrylic polymer having 4 to 12 carbon atoms is preferred.

In addition, the pressure-sensitive adhesive layer preferably has low water absorption and excellent heat resistance from the viewpoints of preventing a foaming phenomenon or peeling phenomenon due to water absorption, preventing degradation of optical properties or warping of the liquid crystal cell due to difference in thermal expansion or the like, and forming a high-quality liquid crystal display apparatus having excellent durability.

The pressure-sensitive adhesive layer may contain additives which may be added to a pressure-sensitive adhesive layer such as resins of natural substances or synthetic substances, in particular, a tackifying resin, or a filler, pigment, colorant, or antioxidant formed of glass fiber, glass beads, metal powder, or other inorganic powder.

The pressure-sensitive adhesive layer may be a pressure-sensitive adhesive layer containing fine particles to exhibit light diffusion property.

The pressure-sensitive adhesive layer may be provided through any appropriate method. Examples thereof include: a method involving preparing an about 10 to 40 wt % pressure-sensitive adhesive solution containing a base polymer or its composition dissolved or dispersed in an appropriate single solvent such as toluene or ethyl acetate or a mixed solvent thereof, and directly providing the solution on an optical film (the first birefringent layer, for example) through an appropriate developing method such as a flow casting method or an application method; and a method involving forming a pressure-sensitive adhesive layer on a separator as described above, and transferring and bonding the pressure-sensitive adhesive layer to a surface of an optical film (the first birefringent layer, for example).

The pressure-sensitive adhesive layer may be provided on one side or both sides of an optical film (the second birefringent layer, for example) as a superimposed layer of layers of different compositions, types, or the like. In the case where the pressure-sensitive adhesive layer is provided on each side of the optical film, pressure-sensitive adhesive layers of different compositions, types, thicknesses, and the like may be provided on front and back surfaces of the optical film.

The thickness of the pressure-sensitive adhesive layer may appropriately be determined in accordance with the intended use or the adhesive strength, and is preferably 1 to 40 µm, more preferably 5 to 30 µm, and particularly preferably 10 to 25 µm. A thickness of less than 1 µm degrades the durability, and a thickness of more than 40 µm is liable to cause floating or peeling due to foaming and the like and provides poor appearance.

An anchor layer may be provided between the optical film (the first birefringent layer, for example) and the pressure-sensitive adhesive layer for improving the adhesive property therebetween.

An anchor layer formed of a polymer selected from polyurethane, polyester, and polymers each having an amino group in a molecule is preferably used as the anchor layer. Particularly preferably, polymers each having an amino group in a molecule are used. A polymer having an amino group in a molecule assures favorable adhesive property because the amino group in a molecule reacts or exhibits interaction such as ionic interaction with a carboxyl group in the pressure-sensitive adhesive or with a polar group in a conductive polymer.

Examples of the polymers each having an amino group in a molecule include: polyethyleneimine; polyallyl amine; polyvinyl amine; polyvinyl pyridine; polyvinyl pyrrolidine; and a polymer of an amino group-containing monomer such as dimethylaminoethyl acrylate as described as a monomer to be copolymerized for the acrylic pressure-sensitive adhesive.

An antistatic agent may be added for providing antistatic property to the anchor layer. Examples of the antistatic agent for providing the antistatic property include: an ionic surfactant-based antistatic agent; a conductive polymer-based antistatic agent such as polyaniline, polythiophene, polypyrrole, or polyquinoxaline; and a metal oxide-based antistatic agent such as tin oxide, antimony oxide, or indium oxide. In particular, the conductive polymer-based antistatic agent is preferably used from the viewpoints of optical properties, appearance, antistatic effect, and stability of the antistatic effect under heating and under moisture. Of those, a water-soluble conductive polymer such as polyaniline or polythiophene, or a water-dispersed conductive polymer is particularly preferably used because in the case where the water-soluble conductive polymer or the water-dispersed conductive polymer is used as a material for forming an antistatic layer, modification of an optical film substrate with an organic solvent during the application step may be suppressed.

In the present invention, the first polarizer 30, the first birefringent layer 60, the second polarizer 50, the second birefringent layer 70, the adhesive layer, the pressure-sensitive adhesive layer, and the like may each have UV absorbing ability by being treated with a UV absorber such as a salicylate-based compound, a benzophenol-based compound, a benzotriazole-based compound, a cyano acrylate-based compound, or a nickel complex-based compound.

Hereinafter, the present invention will be more specifically described by way of examples. However, the present invention is not limited to the examples. Methods of measuring characteristics in the examples are as described below.

<Measurement of Retardation>

Refractive indices nx, ny, and nz of a sample film were measured with an automatic birefringence analyzer (Automatic birefringence analyzer KOBRA-21-ADH manufactured by Oji Scientific Instruments), and an in-plane retardation Δnd and a thickness retardation Rth were calculated. A measurement temperature was 23° C., and a measurement wavelength was 590 nm.

<Measurement of XY Chromaticity>

Figure 4:
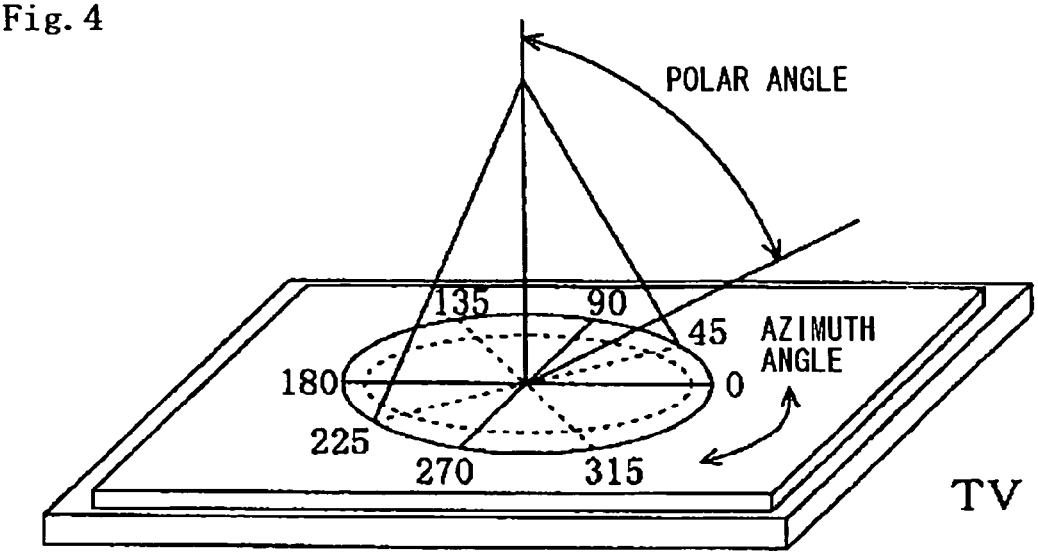
FIG. 4 is a schematic diagram explaining an azimuth angle and a polar angle in color shift measurement.
Figure 5A:
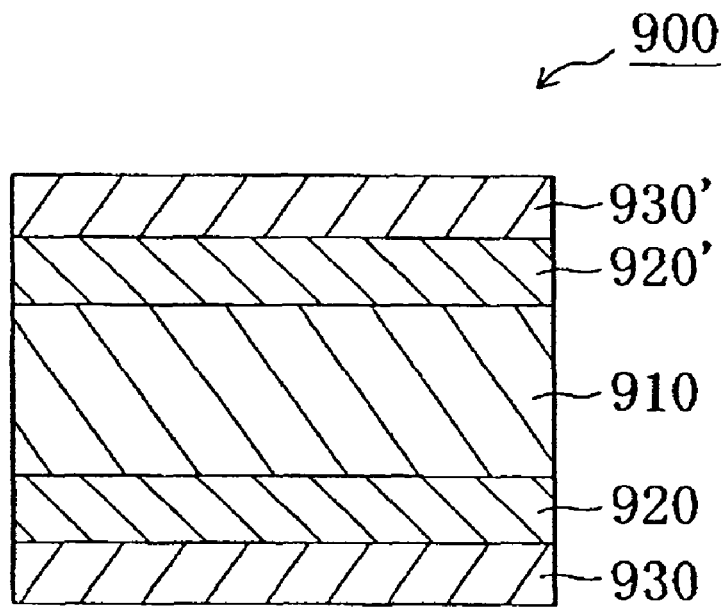
FIG. 5A is a schematic sectional view of a typical conventional liquid crystal display apparatus.
Figure 5B:
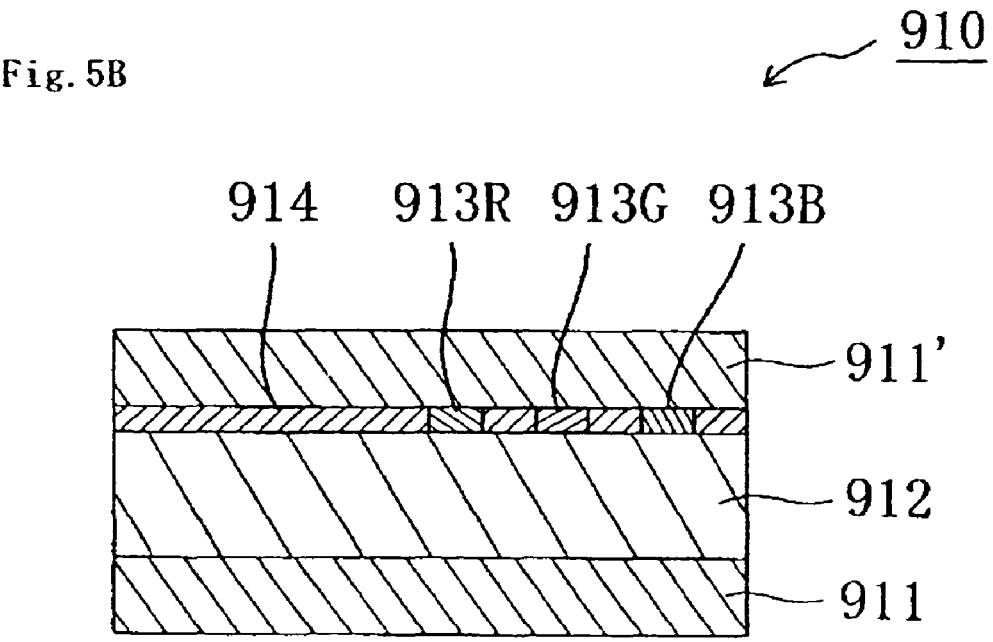
FIG. 5B is a schematic sectional view of a liquid crystal cell to be used for the liquid crystal display apparatus.

Color tones of a liquid crystal display apparatus were measured at a polar angle of 60° and an azimuth angle varying from 0 to 360°, by using "EZ Contrast 160D" (trade name, manufactured by ELDIM SA), and were plotted on an XY chromaticity diagram. FIG. 4 shows the azimuth angle and the polar angle.

Reference Example 1

Production of Polarizer

A polyvinyl alcohol film was colored in an aqueous solution containing iodine, and the resultant was uniaxially stretched to a six times length between rolls with different speed ratios in an aqueous solution containing boric acid, to thereby produce a polarizer.

Reference Example 2

Preparation of Polyvinyl Alcohol-Based Adhesive

An aqueous solution of a polyvinyl alcohol-based adhesive was prepared by adjusting to a concentration of 0.5 wt % an aqueous solution containing 20 parts by weight of methylol melamine with respect to 100 parts by weight (degree of acetylation of 13%) of a polyvinyl alcohol resin subjected to acetoacetyl modification.

Example 1

Production of First Birefringent Layer

A continuous norbornene-based resin film ("ZEONOR", tradename, available from Zeon Corporation, thickness of 100 μm, photoelastic coefficient of $3.10 \times 10^{-12}$ m$^2$/N) was uniaxially stretched to a 1.46 times length at 150° C., to thereby produce a continuous first birefringent layer. The first birefringent layer had a thickness of 80 μm, an in-plane retardation Δnd of 140 nm, and a thickness direction retardation Rth of 140 nm.

Production of Laminate of TAC/Polarizer/First Birefringent Layer

Triacetyl cellulose (TAC) (thickness of 80 μm) and the polarizer were laminated by using an adhesive.

A surface of the thus-obtained first birefringent layer was subjected to easily adhesive treatment (silicon primer, "APZ6661", trade name, available from Dow Corning Toray Co., Ltd., thickness of easily adhesive layer=50 nm), and the first birefringent layer was laminated on a polarizer side of the laminate of TAC and the polarizer by using an adhesive ("GOHSEFIMER Z200", trade name, available from Nippon Synthetic Chemical Industry Co., Ltd., thickness of adhesive layer=40 nm). The lamination was performed such that an absorption axis of the polarizer and a slow axis of the first birefringent layer were perpendicular to each other.

In this way, a laminate of TAC/polarizer/first birefringent layer was obtained.

Production of Laminate of Second Birefringent Layer/TAC

A 15 wt % solution prepared by using polyimide synthesized from 2,2'-bis(3,4-dicarboxyphenyl)hexafluoropropane and 2,2'-bis(trifluoromethyl)-4,4'-diaminobiphenyl, and cyclohexanone as a solvent was applied to a TAC substrate (thickness of 80 μm) to a thickness of 20 μm. Then, the whole was subjected to drying treatment at 100° C. for 10 minutes, to thereby produce a laminate of the second birefringent layer and TAC having a thickness of 2.5 μm.

The retardation of the obtained second birefringent layer with the substrate was measured by using an automatic birefringence analyzer "KOBRA-21ADH", manufactured by Oji Scientific Instruments. The second birefringent layer with the substrate satisfied a relationship of nx=ny>nz, and had an in-plane retardation Δnd of 0 nm and a thickness direction retardation Rth of 230 nm.

Production of Laminate of Second Birefringent Layer/TAC/Polarizer/TAC

The polarizer was laminated on a TAC surface of the laminate of the second birefringent layer and TAC by using a polyvinyl alcohol-based adhesive (thickness of adhesive layer=50 nm). The lamination was performed such that a slow axis of the second birefringent layer and the absorption axis of the polarizer were substantially perpendicular to each other. A TAC film (thickness of 80 μm) was laminated on the polarizer on a side opposite to the second birefringent layer by using a polyvinyl alcohol-based adhesive (thickness of adhesive layer=50 nm), to thereby obtain a laminate of second birefringent layer/TAC/polarizer/TAC.

Production of Liquid Crystal Panel

The first birefringent layer side of the "laminate of TAC/polarizer/first birefringent layer" and the second birefringent layer side of the "laminate of second birefringent layer/TAC/polarizer/TAC" were attached above and below a liquid crystal cell through an acrylic pressure-sensitive adhesive (thickness of 20 μm) such that the absorption axes of the respective polarizers were perpendicular to each other. The liquid cell was removed from a commercially available liquid crystal TV (32-inch TV, manufactured by BenQ Corporation) and was used.

Evaluation

Figure 6:
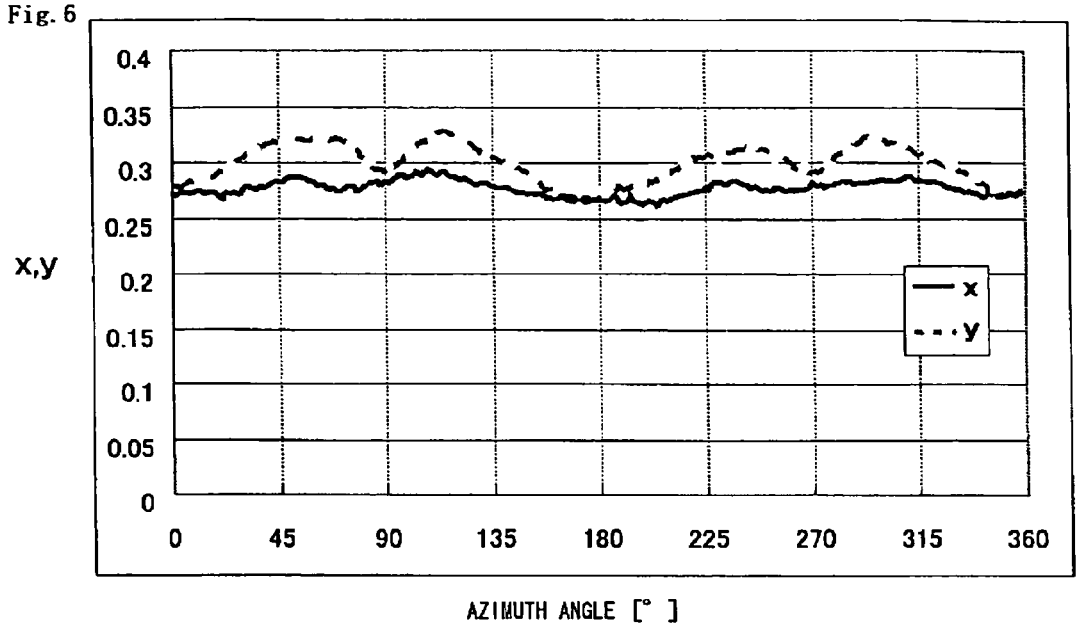
FIG. 6 is an XY chromaticity diagram at a polar angle of 60° and an azimuth angle varying from 0 to 360° in Example 1 of the present invention.

FIG. 6 shows the results of XY chromaticity of the TV measured by using EZ Contrast, manufactured by ELDIM SA. FIG. 6 shows that a wave pattern of X and a wave pattern of Y are similar, and that respective amplitudes are small. That is, FIG. 6 indicates that a neutral display is obtained in all azimuth angle directions.

Example 2

Production of Liquid Crystal Panel

A "laminate of TAC/polarizer/first birefringent layer" and a "laminate of second birefringent layer/TAC/polarizer/TAC" were obtained in the same manner as in Example 1 except that a second birefringent layer having an in-plane retardation Δnd of 0 nm and a thickness direction retardation Rth of 190 nm was obtained by changing the thickness to 2.1 μm in "Production of laminate of second birefringent layer/TAC" of Example 1.

The first birefringent layer side of the "laminate of TAC/polarizer/first birefringent layer" and the second birefringent layer side of the "laminate of second birefringent layer/TAC/polarizer/TAC" were attached above and below a liquid crystal cell through an acrylic pressure-sensitive adhesive (thickness of 20 μm) such that the absorption axes of the respective polarizers were perpendicular to each other. The liquid cell was removed from a commercially available liquid crystal TV (32-inch TV, manufactured by SHARP Corporation) and was used.

Evaluation

Figure 7:
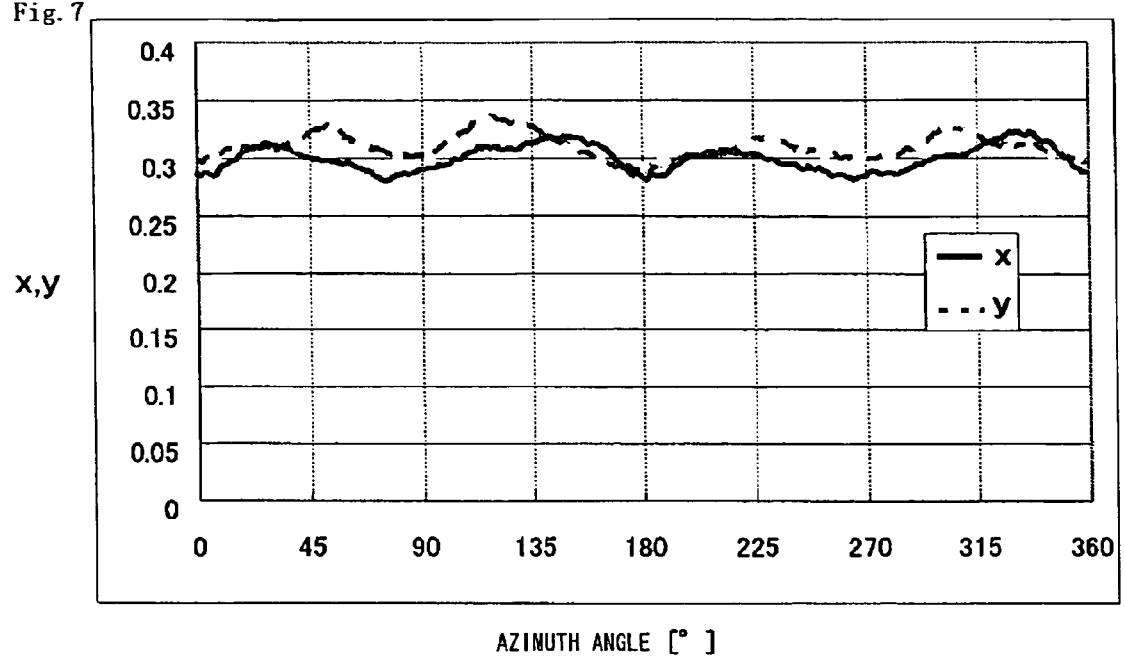
FIG. 7 is an XY chromaticity diagram at a polar angle of 60° and an azimuth angle varying from 0 to 360° in Example 2 of the present invention.

FIG. 7 shows the results of XY chromaticity of the TV measured by using EZ Contrast, manufactured by ELDIM SA. FIG. 7 shows that a wave pattern of X and a wave pattern of Y are similar, and that respective amplitudes are small. That is, FIG. 7 indicates that a neutral display is obtained in all azimuth angle directions.

Example 3

Production of Liquid Crystal Panel

A "laminate of TAC/polarizer/first birefringent layer" and a "laminate of second birefringent layer/TAC/polarizer/TAC" were obtained in the same manner as in Example 1 except that a second birefringent layer having an in-plane retardation $\Delta$nd of 0 nm and a thickness direction retardation Rth of 195 nm was obtained by changing the thickness to 2.1 μm in "Production of laminate of second birefringent layer/TAC" of Example 1.

The first birefringent layer side of the "laminate of TAC/polarizer/first birefringent layer" and the second birefringent layer side of the "laminate of second birefringent layer/TAC/polarizer/TAC" were attached above and below a liquid crystal cell through an acrylic pressure-sensitive adhesive (thickness of 20 μm) such that the absorption axes of the respective polarizers were perpendicular to each other. The liquid cell was removed from a commercially available liquid crystal TV (32-inch TV, manufactured by SONY Corporation) and was used.

Evaluation

Figure 8:
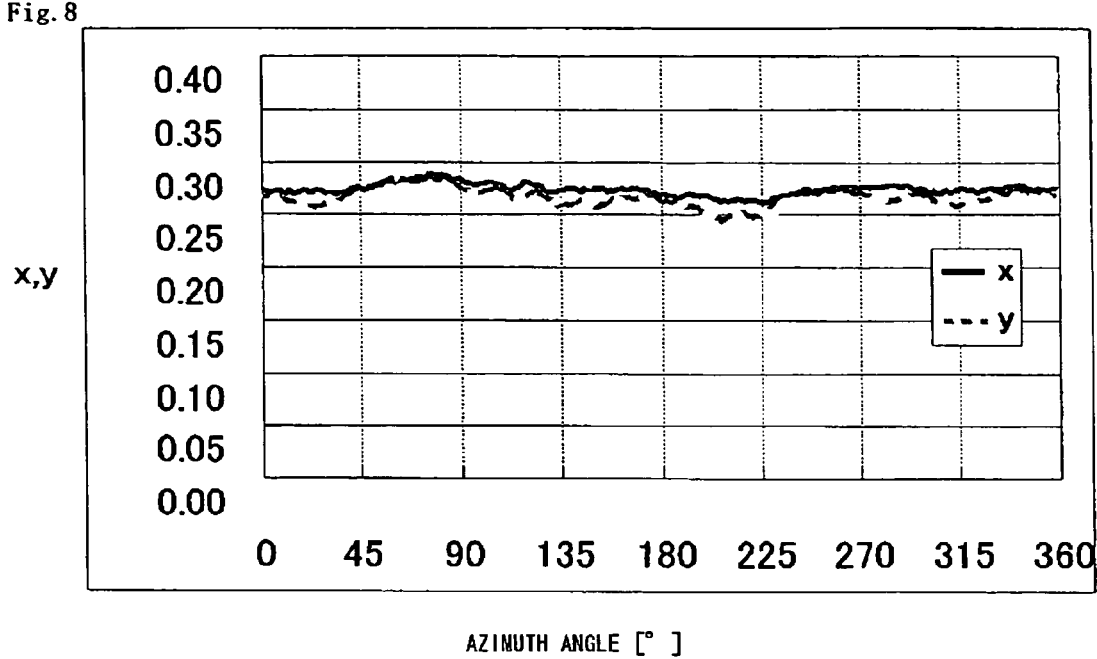
FIG. 8 is an XY chromaticity diagram at a polar angle of 60° and an azimuth angle varying from 0 to 360° in Example 3 of the present invention.

FIG. 8 shows the results of XY chromaticity of the TV measured by using EZ Contrast, manufactured by ELDIM SA. FIG. 8 shows that a wave pattern of X and a wave pattern of Y are similar, and that respective amplitudes are small. That is, FIG. 8 indicates that a neutral display is obtained in all azimuth angle directions.

Example 4

Production of Liquid Crystal Panel

A "laminate of TAC/polarizer/first birefringent layer" and a "laminate of second birefringent layer/TAC/polarizer/TAC" were obtained in the same manner as in Example 1 except that: a second birefringent layer having an in-plane retardation $\Delta$nd of 30 nm and a thickness direction retardation Rth of 170 nm and satisfying a relationship of nx>ny>nz was obtained through longitudinal stretching to a 1.05 times length at 150° C. after the drying treatment in "Production of laminate of second birefringent layer/TAC" of Example 1; and lamination was performed such that the slow axis of the second birefringent layer and the absorption axis of the polarizer were substantially parallel to each other in "Production of laminate of second birefringent layer/TAC/polarizer/TAC" of Example 1.

The first birefringent layer side of the "laminate of TAC/polarizer/first birefringent layer" and the second birefringent layer side of the "laminate of second birefringent layer/TAC/polarizer/TAC" were attached above and below a liquid crystal cell through an acrylic pressure-sensitive adhesive (thickness of 20 μm) such that the absorption axes of the respective polarizers were perpendicular to each other. The liquid cell was removed from a commercially available liquid crystal TV (32-inch TV, manufactured by SHARP Corporation) and was used.

Evaluation

Figure 9:
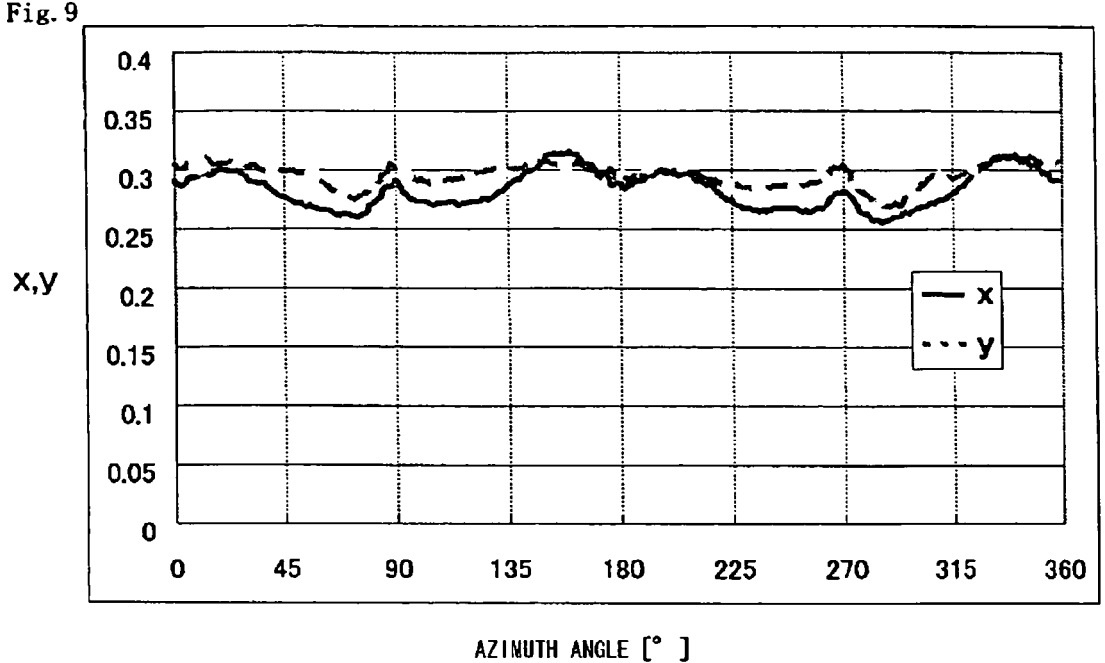
FIG. 9 is an XY chromaticity diagram at a polar angle of 60° and an azimuth angle varying from 0 to 360° in Example 4 of the present invention.

FIG. 9 shows the results of XY chromaticity of the TV measured by using EZ Contrast, manufactured by ELDIM SA. FIG. 9 shows that a wave pattern of X and a wave pattern of Y are similar, and that respective amplitudes are small. That is, FIG. 9 indicates that a neutral display is obtained in all azimuth angle directions.

Comparative Example 1

Production of First Birefringent Layer

A continuous norbornene-based resin film ("ZEONOR", tradename, available from Zeon Corporation, thickness of 100 μm, photoelastic coefficient of $3.10 \times 10^{-12}$ m$^2$/N) was uniaxially stretched to a 1.3 times length at 150° C., to thereby produce a continuous first birefringent layer. The first birefringent layer had a thickness of 85 μm, an in-plane retardation $\Delta$nd of 100 nm, and a thickness direction retardation Rth of 100 nm.

Production of Laminate of TAC/Polarizer/TAC/First Birefringent Layer)

TAC (thickness of 80 μm), the polarizer, and TAC (thickness of 80 μm) were laminated in the order given by using an adhesive.

A surface of the thus-obtained birefringent layer was subjected to easily adhesive treatment (silicon primer, "APZ6661", tradename, available from Dow Corning Toray Co., Ltd., thickness of easily adhesive layer=50 nm), and the first birefringent layer was laminated on one side of the laminate of TAC/polarizer/TAC by using an adhesive ("GOHSEFIMER Z200", trade name, available from Nippon Synthetic Chemical Industry Co., Ltd., thickness of adhesive layer=40 nm). The lamination was performed such that the absorption axis of the polarizer and the slow axis of the first birefringent layer were perpendicular to each other.

In this way, a laminate of TAC/polarizer/TAC/first birefringent layer was obtained.

Production of Laminate of Second Birefringent Layer/TAC

A "laminate of second birefringent layer/TAC" was obtained in the same manner as in Example 1 except that a second birefringent layer having an in-plane retardation $\Delta$nd of 0 nm and a thickness direction retardation Rth of 150 nm was obtained by changing the thickness to 1.6 μm "Production of laminate of second birefringent layer/TAC" of Example 1.

Production of Laminate of Second Birefringent Layer/TAC/Polarizer/TAC)

The polarizer was laminated on a TAC surface of the laminate of the second birefringent layer and TAC by using a polyvinyl alcohol-based adhesive (thickness of adhesive layer=50 nm). The lamination was performed such that a slow axis of the second birefringent layer and the absorption axis of the polarizer were substantially perpendicular to each other. A TAC film (thickness of 80 μm) was laminated on the polarizer on a side opposite to the second birefringent layer by using a polyvinyl alcohol-based adhesive (thickness of adhesive layer=50 nm), to thereby obtain a laminate of second birefringent layer/TAC/polarizer/TAC.

Production of Liquid Crystal Panel

The first birefringent layer side of the "laminate of TAC/polarizer/TAC/first birefringent layer" and the second birefringent layer side of the "laminate of second birefringent layer/TAC/polarizer/TAC" were attached above and below a liquid crystal cell through an acrylic pressure-sensitive adhesive (thickness of 20 μm) such that the absorption axes of the respective polarizers were perpendicular to each other. The liquid cell was removed from a commercially available liquid crystal TV (32-inch TV, manufactured by BenQ Corporation) and was used.

Evaluation

Figure 10:
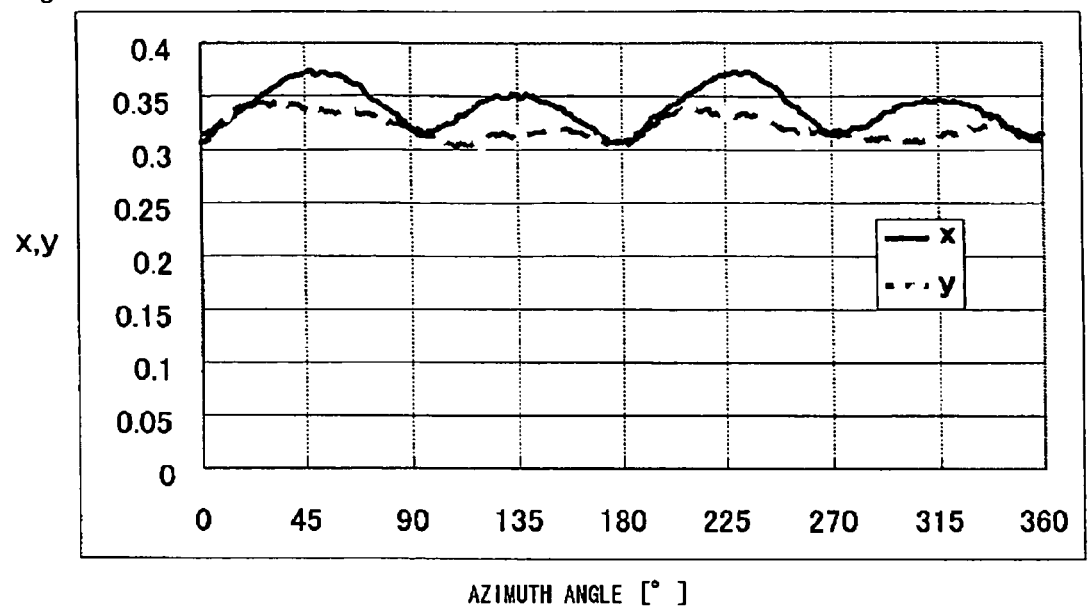
FIG. 10 is an XY chromaticity diagram at a polar angle of 60° and an azimuth angle varying from 0 to 360° in Comparative Example 1 of the present invention.

FIG. 10 shows the results of XY chromaticity of the TV measured by using EZ Contrast, manufactured by ELDIM SA. FIG. 10 shows that a wave pattern of X and a wave pattern of Y are different, and that respective amplitudes are large. That is, FIG. 10 indicates that a neutral display is not obtained in all azimuth angle directions.

Comparative Example 2

Production of Liquid Crystal Panel

A "laminate of TAC/polarizer/TAC/first birefringent layer" and a "laminate of second birefringent layer/TAC/polarizer/TAC" were obtained in the same manner as in Comparative Example 1 except that a second birefringent layer having an in-plane retardation Δnd of 0 nm and a thickness direction retardation Rth of 120 nm was obtained by changing the thickness to 1.3 μm in "Production of laminate of second birefringent layer/TAC" of Comparative Example 1.

The first birefringent layer side of the "laminate of TAC/polarizer/TAC/first birefringent layer" and the second birefringent layer side of the "laminate of second birefringent layer/TAC/polarizer/TAC" were attached above and below a liquid crystal cell through an acrylic pressure-sensitive adhesive (thickness of 20 μm) such that the absorption axes of the respective polarizers were perpendicular to each other. The liquid cell was removed from a commercially available liquid crystal TV (32-inch TV, manufactured by SHARP Corporation) and was used.

Evaluation

Figure 11:
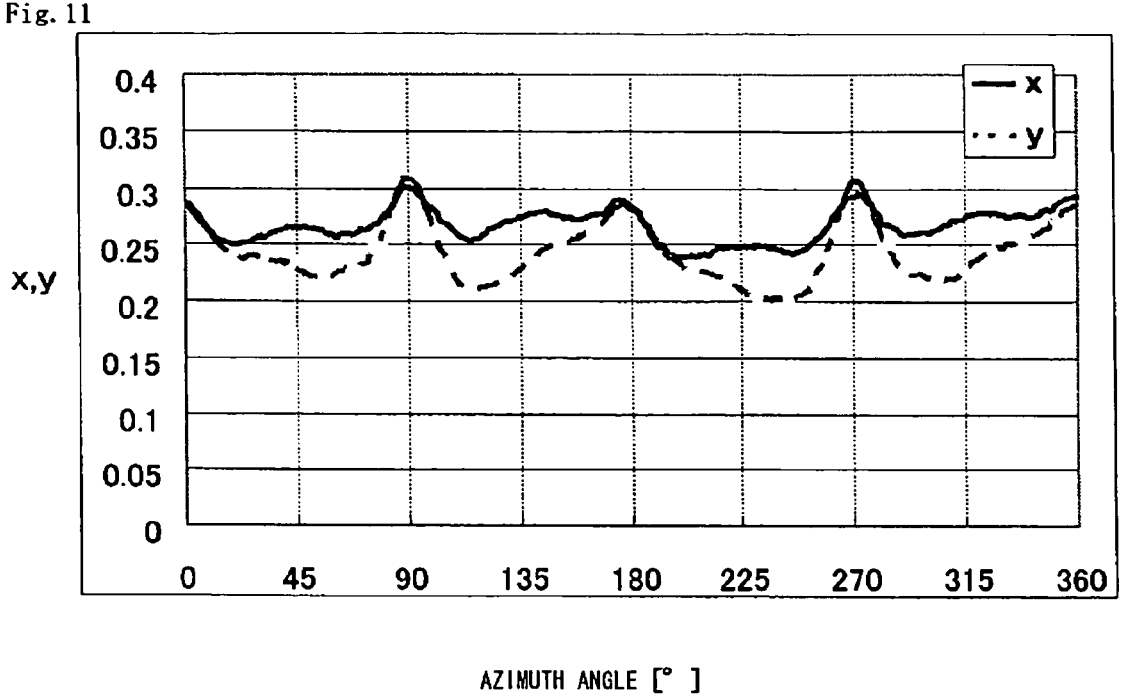
FIG. 11 is an XY chromaticity diagram at a polar angle of 60° and an azimuth angle varying from 0 to 360° in Comparative Example 2 of the present invention.

FIG. 11 shows the results of XY chromaticity of the TV measured by using EZ Contrast, manufactured by ELDIM SA. FIG. 11 shows that a wave pattern of X and a wave pattern of Y are different, and that respective amplitudes are large. That is, FIG. 11 indicates that a neutral display is not obtained in all azimuth angle directions.

Comparative Example 3

Production of Liquid Crystal Panel

A "laminate of TAC/polarizer/TAC/first birefringent layer" and a "laminate of second birefringent layer/TAC/polarizer/TAC" were obtained in the same manner as in Comparative Example 1 except that a second birefringent layer having an in-plane retardation Δnd of 0 nm and a thickness direction retardation Rth of 130 nm was obtained by changing the thickness to 1.4 μm in "Production of laminate of second birefringent layer/TAC" of Comparative Example 1.

The first birefringent layer side of the "laminate of TAC/polarizer/TAC/first birefringent layer" and the second birefringent layer side of the "laminate of second birefringent layer/TAC/polarizer/TAC" were attached above and below a liquid crystal cell through an acrylic pressure-sensitive adhesive (thickness of 20 μm) such that the absorption axes of the respective polarizers were perpendicular to each other. The liquid cell was removed from a commercially available liquid crystal TV (32-inch TV, manufactured by SONY Corporation) and was used.

Evaluation

Figure 12:
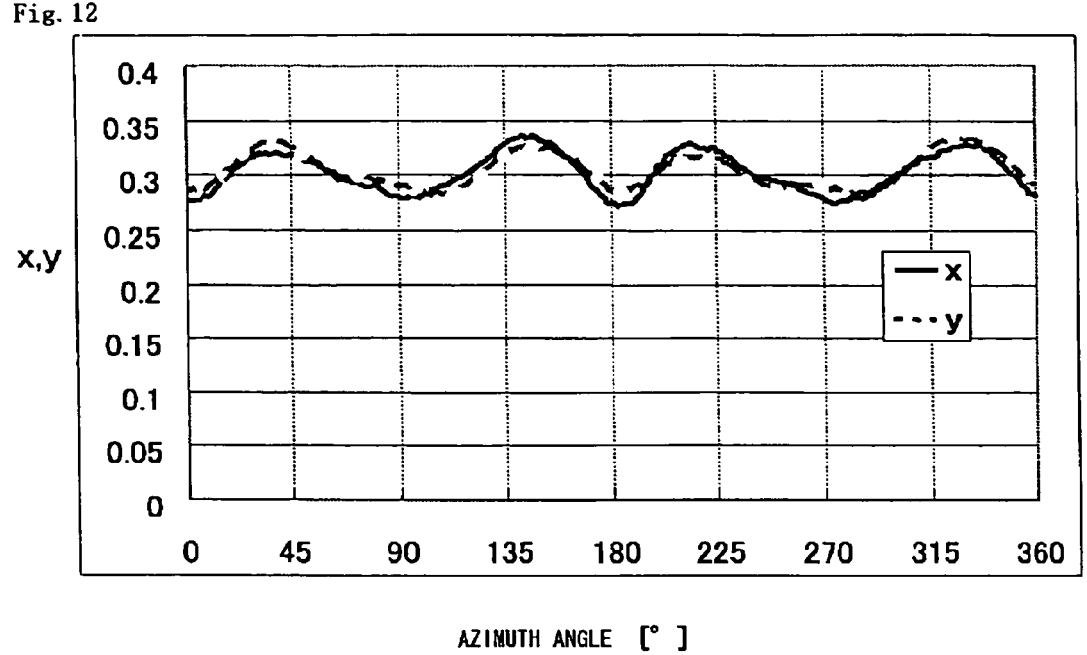
FIG. 12 is an XY chromaticity diagram at a polar angle of 60° and an azimuth angle varying from 0 to 360° in Comparative Example 3 of the present invention.

FIG. 12 shows the results of XY chromaticity of the TV measured by using EZ Contrast, manufactured by ELDIM SA. FIG. 12 shows that a wave pattern of X and a wave pattern of Y are similar, but that respective amplitudes are large. That is, FIG. 12 indicates that a neutral display is not obtained in all azimuth angle directions.

The liquid crystal panel of the present invention and the liquid crystal display apparatus including the liquid crystal panel may suitably used for a liquid crystal television, a cellular phone, or the like.

What is claimed is:

1. A liquid crystal panel comprising:
a liquid crystal cell; and
an optical film arranged on a viewer side of the liquid crystal cell,
wherein the optical film comprises a transparent film, a polarizer, and a birefringent layer having a relationship of nx>ny=nz and positive uniaxial property in the stated order, and
another birefringent layer having a relationship of nx>ny>nz arranged on a backlight side of the liquid crystal cell,
wherein the polarizer and the birefringent layer are laminated directly through a layer of an adhesive layer having the thickness of 0.01 to 0.15 μm and without a transparent protective film arranged therebetween, and
wherein the birefringent layer having the relationship of nx>ny=nz and positive uniaxial property is the only birefringent layer arranged on a viewer side of the liquid crystal cell.

2. A liquid crystal panel according to claim 1, wherein the transparent protective film comprises one of a cellulose-based film and a norbornene-based film.

3. A liquid crystal panel according to claim 1, wherein an absorption axis of the polarizer and a slow axis of the birefringent layer are substantially perpendicular to each other.

4. A liquid crystal panel according to claim 1, wherein the birefringent layer comprises a λ/4 plate.

5. A liquid crystal panel according to claim 1, wherein the birefringent layer has an in-plane retardation Δnd of 90 to 160 nm.

6. A liquid crystal panel according to claim 1, wherein the birefringent layer has an absolute value of the difference between an in-plane retardation Δnd and a thickness direction retardation Rth of 10 nm or less.

7. A liquid crystal panel according to claim 1, wherein the birefringent layer has an absolute value of photoelastic coefficient of $2.0 \times 10^{-13}$ to $2.0 \times 10^{-11}$ m$^2$/N.

8. A liquid crystal panel according to claim 1, wherein the birefringent layer contains one of a cyclic olefin-based resin and a cellulose-based resin.

9. A liquid crystal panel according to claim 1, further comprising an easily adhesive layer between the birefringent layer and one of a pressure-sensitive adhesive layer formed of the pressure-sensitive adhesive and an adhesive layer formed of the adhesive.

10. A liquid crystal panel according to claim 9, wherein the easily adhesive layer contains one resin selected from the group consisting of a silicon-based resin, a urethane-based resin, and an acrylic resin.

11. A liquid crystal panel according to claim 1, wherein the liquid crystal cell is of VA mode.

12. A liquid crystal panel according to claim 1, wherein the liquid crystal cell is of OCB mode.

13. A liquid crystal panel according to claim 1, wherein the birefringent layer on a backlight side contains one selected from the group consisting of polyamide, polyimide, polyester, polyetherketone, polyamideimide, and polyesterimide.

14. A liquid crystal display apparatus comprising the liquid crystal panel according to claim 1.

* * * * *